(12) United States Patent
Yoshihara

(10) Patent No.: US 8,446,673 B2
(45) Date of Patent: May 21, 2013

(54) ANTI-REFLECTION FILM HAVING AN ANTISTATIC HARD COAT AND LOW REFRACTIVE INDEX LAYERS AND MANUFACTURING METHOD THEREOF

(75) Inventor: Toshiaki Yoshihara, Tokyo (JP)

(73) Assignee: Toppan Printing Co., Ltd. (JP)

( * ) Notice: Subject to any disclaimer, the term of this patent is extended or adjusted under 35 U.S.C. 154(b) by 617 days.

(21) Appl. No.: 12/705,543

(22) Filed: Feb. 12, 2010

(65) Prior Publication Data

US 2010/0208350 A1  Aug. 19, 2010

(30) Foreign Application Priority Data

Feb. 17, 2009  (JP) ................................. 2009-033719

(51) Int. Cl.
*G02B 1/10* (2006.01)
(52) U.S. Cl.
USPC ............................ 359/585; 359/586; 359/601
(58) Field of Classification Search
None
See application file for complete search history.

(56) References Cited

U.S. PATENT DOCUMENTS

| | | | | |
|---|---|---|---|---|
| 2002/0068156 A1* | 6/2002 | Suzuki et al. | | 428/208 |
| 2005/0266208 A1* | 12/2005 | Raychaudhuri et al. | | 428/143 |
| 2007/0047087 A1* | 3/2007 | Fukuda et al. | | 359/582 |
| 2007/0110995 A1* | 5/2007 | Liu | | 428/323 |
| 2008/0095997 A1* | 4/2008 | Chiang et al. | | 428/215 |
| 2009/0316271 A1* | 12/2009 | Shibayama | | 359/601 |
| 2010/0227085 A1* | 9/2010 | Yoshihara | | 428/1.6 |
| 2012/0251778 A1* | 10/2012 | Shimano et al. | | 428/144 |

FOREIGN PATENT DOCUMENTS

| | | |
|---|---|---|
| JP | 11-092750 | 4/1999 |
| JP | 2005-144849 | 6/2005 |
| JP | 2005-199707 | 7/2005 |
| JP | 2005-202389 | 7/2005 |
| JP | 2006-159415 | 6/2006 |
| JP | 2007-121993 | 5/2007 |

* cited by examiner

*Primary Examiner* — Arnel C Lavarias
(74) *Attorney, Agent, or Firm* — Squire Sanders (US) LLP

(57) ABSTRACT

An anti-reflection film which has not only sufficient anti-reflection properties and antistatic properties but also excellent optical properties is provided. The anti-reflection film includes an antistatic hard coat layer and a low refractive index layer on a transparent substrate, the antistatic hard coat layer containing conductive particles and a binder matrix, the antistatic hard coat layer including a mixed layer in which the transparent substrate component and the binder matrix blend together with a gradient and a localized layer, the mixed layer being optically indistinguishable and the localized layer being optically distinguishable, and the localized layer having an optical thickness of 50-400 nm.

12 Claims, 5 Drawing Sheets

ANTI-REFLECTION FILM HAVING AN ANTISTATIC HARD COAT AND LOW REFRACTIVE INDEX LAYERS AND MANUFACTURING METHOD THEREOF

CROSS REFERENCE TO RELATED APPLICATION

This application is based on and claims the benefit of priority from the Japanese Patent Application number 2009-033719, filed on Feb. 17, 2009, the entire contents of which are incorporated herein by reference.

BACKGROUND OF THE INVENTION

1. Field of the Invention

The present invention relates to an anti-reflection film which is arranged in order to prevent external light from reflecting on a window or a surface of display devices etc. Specifically, the present invention relates to an anti-reflection film applied on a surface of a liquid crystal display (LCD), CRT display, organic electroluminescent display (ELD), plasma display (PDP), surface-conduction electron-emitter display (SED) and field emission display (FED) etc. Among these, this invention relates to an anti-reflection film applied on a surface of an LCD, especially a transmission type LCD.

2. Description of the Related Art

In general, displays are used under external light whether they are used indoors or outdoors. The external light incident to a display surface is reflected on the surface so that a displayed image is interfered with by the reflected image and the quality of display decreases. Hence, it is necessary to provide a display surface with an anti-reflection function, and further, improvements of the anti-reflection function along with introductions of other extra useful functions are being demanded.

In general, an anti-reflection function is realized by forming an anti-reflection layer having a multilayer structure with repeating high refractive index layers and low refractive index layers made of a transparent material such as metal oxide on a transparent substrate. The anti-reflection layer having this type of multilayer structure can be obtained by a dry coating method such as chemical vapor deposition (CVD) and physical vapor deposition (PVD). In the case where the anti-reflection layer is formed by a dry coating, while there is an advantage of fine thickness controllability, there is also a problem of low productivity due to a limitation of a deposition process performed in a vacuum chamber, which is unsuitable for mass production. Thus, wet coating methods, which make it possible to provide a large display, produce continuously, and reduce costs, attract attention as a forming method of an anti-reflection layer In addition, an anti-reflection film in which the anti-reflection layer is arranged on a transparent substrate generally has a hard coat layer formed by curing an acrylic material between the transparent substrate and the anti-reflection layer for the purpose of providing a surface hardness to a relatively soft surface of the anti-reflection layer. The hard coat layer is provided with a high level of surface hardness, abrasion resistance, luster and transparency due to the acrylic material.

The hard coat layer made by curing an acrylic material, however, is liable to take charge because of its insulation quality and has a problem of attracting dust to the surface of the anti-reflection film in which the hard coat layer is arranged. Thus, it is required that the anti-reflection film has an antistatic function. In the case where an anti-reflection film in which a hard coat layer and an anti-reflection layer are included is arranged on a surface of an LCD, it is required that the anti-reflection film has an antistatic function in order to prevent a charged surface from adversely affecting the inner circuitry of the LCD.

In order to provide an antistatic function to an anti-reflection film having a hard coat layer and an anti-reflection layer, a method of adding conductive agent to the hard coat layer or a method in which an antistatic layer is arranged between the substrate and the hard coat layer or between the hard coat layer and the anti-reflection layer can be used.

<Patent document 1>JP-A-2005-202389
<Patent document 2>JP-A-2005-199707
<Patent document 3>JP-A-H11-092750
<Patent document 4>JP-A-2007-121993
<Patent document 5>JP-A-2005-144849
<Patent document 6>JP-A-2006-159415

It is possible to reduce reflection of external light by arranging an anti-reflection film having a hard coat layer and anti-reflection layer on the surface of a display device and utilizing its anti-reflection function so that a contrast in the light place can be improved. In addition, since the transmittance of the anti-reflection film can be improved, it is possible to display an image more brightly. The anti-reflection film is also expected to have an energy saving effect due to a reduction of the power consumption of the backlight etc.

In the case where an antistatic function is provided to the anti-reflection film by adding conductive materials, the optical properties of the resultant anti-reflection film depend on the types of the conductive materials added thereto. In the case where conductive materials are added to the anti-reflection film, a problem of an insufficient contrast occurs due to a fall in luminance during display of a white image (this luminance is referred to as white luminance) when the film is arranged on an LCD surface.

In the case of a method in which an antistatic function is provided by newly arranging an antistatic layer, the production cost becomes high due to an increase in the number of layers resulting in a fall in productivity. In addition, since it is necessary in general to arrange an antistatic layer with high refractive index between the layers, color generation or color unevenness tends to occur by the antistatic layer. Especially in the case where the antistatic layer and the low refractive index layer (the anti-reflection layer) are formed by a wet coating method, there was a problem of color unevenness of the anti-reflection film according to the unevenness in layer thickness.

The anti-reflection film in which an antistatic function is provided by adding conductive materials to the hard coat layer requires lower production costs than the anti-reflection film in which an antistatic function is provided by newly arranging an antistatic layer. However, the former type of anti-reflection film requires a large amount of conductive material and leads to problems such as increase in cost of material, decrease in hardness of the hard coat layer, decrease in visible light transmittance, and interference fringe generation caused by the difference in refractive index between the substrate and the hard coat layer etc.

SUMMARY OF THE INVENTION

The present invention provides an anti-reflection film having an antistatic hard coat layer, in which conductive materials are added to a hard coat layer, and low refractive index layer on at least one surface of the transparent substrate, and further, having not only sufficient anti-reflection properties and antistatic properties but also excellent optical properties.

In order to solve the problems, a first aspect of the present invention is an anti-reflection film having a transparent substrate, an antistatic hard coat layer and a low refractive index layer, the antistatic hard coat layer and said low refractive index layer being formed on the transparent substrate, the antistatic hard coat layer containing conductive particles and a binder matrix, the antistatic hard coat layer including a mixed layer in which the binder matrix and a component of the transparent substrate blend together with a gradient and a localized layer which includes the conductive particles and the binder matrix, the mixed layer being optically indistinguishable, and the localized layer being optically distinguishable and having an optical thickness in the range of 50-400 nm.

In addition, a second aspect of the present invention is the anti-reflection film according to the first aspect of the present invention, wherein the optical thickness of the localized layer is in the range of 200-350 nm.

In addition, a third aspect of the present invention is the anti-reflection film according to the first or second aspect of the present invention, wherein a content ratio of the conductive particles in the antistatic hard coat layer is in the range of 0.5-5 wt %, and a content amount of the conductive particles per unit area of the antistatic hard coat layer is in the range of 0.05-0.5 g/m$^2$.

In addition, a fourth aspect of the present invention is the anti-reflection film according to any one of the first to third aspects of the present invention, wherein the intermediate layer is optically indistinguishable and is arranged between the mixed layer and the localized layer.

In addition, a fifth aspect of the present invention is the anti-reflection film according to fourth aspect of the present invention, wherein the localized layer has a larger refractive index than the intermediate layer by a difference in the 0.01-0.05 range.

In addition, a sixth aspect of the present invention is the anti-reflection film according to any one of the fourth to fifth aspects of the present invention, wherein the intermediate layer includes 95 wt % or more of the binder matrix.

In addition, a seventh aspect of the present invention is the anti-reflection film according to any one of the fourth to sixth aspects of the present invention, wherein the intermediate layer has a thickness of 2 μm or more.

In addition, an eighth aspect of the present invention is the anti-reflection film according to any one of the first to seventh aspect of the present invention, wherein the antistatic hard coat layer has a thickness in the range of 3-15 μm.

In addition, a ninth aspect of the present invention is the anti-reflection film according to any one of the first to eighth aspect of the present invention, wherein the mixed layer has a thickness of 0.5 μm or more.

In addition, a tenth aspect of the present invention is the anti-reflection film according to any one of the first to ninth aspect of the present invention, wherein a parallel light transmittance thereof is in range of 93.0-97.0%, and a surface resistivity of the low refractive index layer is in the range of $1.0 \times 10^6$ to $1.0 \times 10^{11} \Omega/\square$.

In addition, an eleventh aspect of the present invention is the anti-reflection film according to any one of the first to tenth aspects of the present invention, wherein an average luminous reflectance on the low refractive index layer surface is in the range of 0.5-1.5%, and a reflection hue in the L*a*b* chromaticity coordinate system on the low refractive index layer surface satisfies $0.00 \leq a^* \leq 3.00$ and $-3.00 \leq b^* \leq 3.00$.

In addition, a twelfth aspect of the present invention is the anti-reflection film according to any one of the first to eleventh aspects of the present invention, wherein the transparent substrate is mainly made of triacetyl cellulose film.

In addition, a thirteenth aspect of the present invention is a polarizing plate including the anti-reflection film according to any one of the first to twelfth aspects of the present invention, and further comprising a polarizing layer and a second transparent substrate, the polarizing layer and the second transparent substrate are arranged on the opposite surface of the anti-reflection film from a side on which the low refractive index layer is formed.

In addition, a fourteenth aspect of the present invention is a transmission type LCD including the polarizing plate according to the thirteenth aspect of the present invention, and further comprising a liquid crystal cell, a second polarizing plate and a backlight unit.

In addition, a fifteenth aspect of the present invention is a method for manufacturing an anti-reflection film which has an antistatic hard coat layer and a low refractive index layer on a transparent substrate including coating a coating liquid for forming the antistatic hard coat layer to form a coated layer on the transparent substrate, drying the coated layer, and forming the low refractive index layer on the antistatic hard coat layer, the coating liquid for forming the antistatic hard coat layer containing conductive particles, a binder matrix and solvents, the coating liquid for forming the antistatic hard coat layer containing a solvent which dissolves transparent substrate or causes the transparent substrate to swell by a ratio in the range of 30-90 wt % to the total amount of the solvents, the antistatic hard coat layer including a mixed layer in which the binder matrix and a component of the transparent substrate blend together with a gradient and a localized layer which comprises the conductive particles and the binder matrix, and the localized layer being optically distinguishable and having an optical thickness in the range of 50-400 nm.

In addition, a sixteenth aspect of the present invention is the method according to the fifteenth aspect of the present invention, wherein an intermediate layer which is optically indistinguishable is arranged between the mixed layer and the localized layer, and the localized layer has a larger refractive index than the intermediate layer by a difference in the 0.01-0.05 range.

In addition, a seventeenth aspect of the present invention is the method according to any one of the fifteenth to sixteenth aspects of the present invention, wherein it takes a time in the range of 2-60 seconds for the solvents contained in the coated layer to evaporate off to a level of 10 wt % or lower after the coated layer is formed.

In addition, an eighteenth aspect of the present invention is the method according to any one of the fifteenth to seventeenth aspects of the present invention, wherein the coating liquid for forming the antistatic hard coat layer contains the solvents by a ratio in the range of 55-85 wt %.

In addition, a nineteenth aspect of the present invention is the method according to the fifteenth aspect of the present invention, wherein the process of drying the coated layer is performed under an atmosphere condition of a solvent concentration in the range of 0.2-10 vol %.

In addition, a twentieth aspect of the present invention is the method according to any one of the fifteenth to nineteenth aspects of the present invention, wherein the process of drying the coated layer includes a primary drying process which is preformed at a temperature in the range of 20-30° C. and a secondary drying process which is performed at a temperature in the range of 50-150° C.

In addition, a twenty-first aspect of the present invention is the method according to the twentieth aspect of the present invention, wherein it takes a time in the range of 2-60 seconds to perform the primary drying process.

In addition, a twenty-second aspect of the present invention is the method according to any one of the fifteenth to twenty-first aspects of the present invention, wherein the transparent substrate is triacetyl cellulose, and the solvents include N-methylpyrrolidone.

An anti-reflection film of the present invention has an antistatic hard coat layer and a low refractive index layer on at least one surface of the transparent substrate, the antistatic hard coat layer containing conductive particles and a binder matrix, the antistatic hard coat layer having a mixed layer, in which the transparent substrate and the binder matrix are mixed together with a gradient composition, and a localized layer, which includes the binder matrix and the conductive particles, the mixed layer being optically indistinguishable, the localized layer being optically distinguishable, and a thickness of the localized layer being in the range of 50-400 nm. Since a formation of the localized layer, in which conductive particles are concentrated, makes it possible to reduce total usage of the conductive particles and yet maintain sufficient antistatic effect, it is possible to reduce material costs and prevent a surface hardness and a visible light transmittance decrease of the anti-reflection film caused by an addition of excessive conductive particles. In addition, the production costs can be lower than those in the case where the antistatic layer is formed separately from the hard coat layer.

Moreover, the mixed layer in the anti-reflection film of the present invention is optically indistinguishable. As the composition (a ratio of the transparent substrate component and the binder matrix) in the mixed layer varies with gradient, there are no points at which an acute change in refractive index exists so that the interference generation caused by a difference in refractive index between the both layers adjacent to the mixed layer (the transparent substrate and the localized layer) at their boundary is prevented.

In addition, it is possible to make the localized layer work as a high refractive index layer to provide the anti-reflection film with an anti-reflection function, and is it possible to prevent the anti-reflection film from obtaining color unevenness by using an optically distinguishable layer having an optical thickness in the range of 50-400 nm as the localized layer in the anti-reflection film of the present invention. Moreover, it is also possible to ensure a hard coat function and prevent interference fringe generation by arranging the optically indistinguishable intermediate layer between the mixed layer and the localized layer. The localized layer can be a still better high refractive index layer if the refractive index thereof is larger than the refractive index of the intermediate layer and the difference in refractive index is in the 0.01-0.05 range. It is possible to make the anti-reflection film of the present invention have a high level of optical properties by an optical interference between the localized layer in the antistatic hard coat layer and the low refractive index layer which is arranged adjacent to the localized layer.

BRIEF DESCRIPTION OF THE DRAWINGS

FIG. 5A illustrates an example of an anti-reflection film having a mixed layer and an intermediate layer which are optically indistinguishable. FIG. 5B illustrates an example of an anti-reflection film having a mixed layer but almost no intermediate layer. FIG. 5C illustrates an example of an anti-reflection film having a thin mixed layer and an intermediate layer which is optically distinguishable by the thin mixed layer.

DESCRIPTION OF REFERENCE NUMERALS AND SIGNS

| | |
|---|---|
| 1: | Anti-reflection film |
| 11: | First transparent substrate |
| 12: | Antistatic hard coat layer |
| 12a: | Mixed layer |
| 12b: | Intermediate layer |
| 12c: | Localized layer |
| 13: | Low refractive index layer |
| 2: | Polarizing plate |
| 22: | Second transparent substrate |
| 23: | Polarizing layer |
| 3: | Liquid crystal cell |
| 4: | Second polarizing plate |
| 41: | Third transparent substrate |
| 42: | Fourth transparent substrate |
| 43: | Second polarizing layer |
| 5: | Backlight unit |
| A: | Peaks can be detected because of an acute change (optically distinguishable). |
| B: | Peaks can not be detected because a change of slope is mild (optically indistinguishable). |
| C: | Broad peaks can be detected because a change of slope is steep (optically distinguishable). |

DETAILED DESCRIPTION OF THE INVENTION

An anti-reflection film of the present invention is described below.

Figure 1:
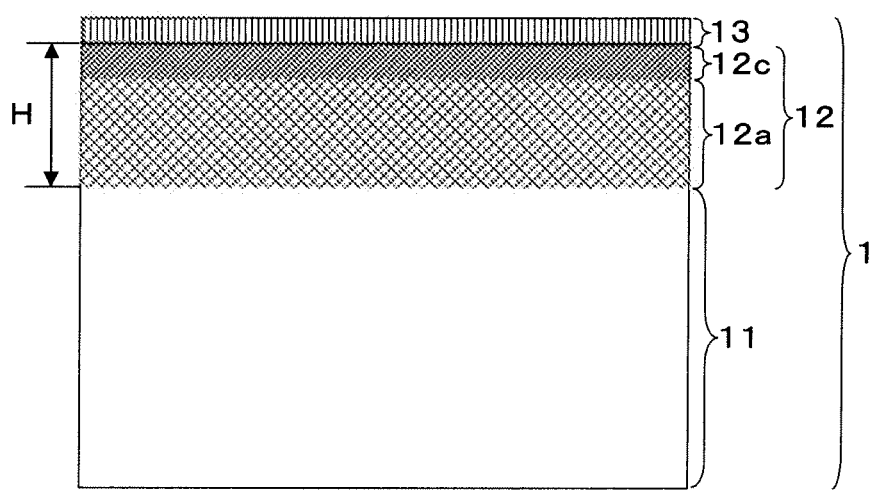
FIG. 1 shows a cross sectional exemplary diagram of an anti-reflection film of the present invention.

FIG. 1 illustrates a cross sectional exemplary diagram of an anti-reflection film of the present invention. An anti-reflection film 1 of the present invention has an antistatic hard coat layer 12 and low refractive index layer 13 in order on at least one surface of a transparent substrate 11. It is possible to obtain an anti-reflection film with excellent abrasion resistance by forming an antistatic hard coat layer 12 on the transparent substrate 11 so as to provide a high level of surface hardness to the film. In addition, it is possible to provide an antistatic function to the anti-reflection film by adding conductive particles to the hard coat layer to make the antistatic hard coat layer 12.

The antistatic hard coat layer 12 in the anti-reflection film 1 of the present invention has a binder matrix and conductive particles. The binder matrix in the antistatic hard coat layer of the present invention refers to parts other than the conductive particles. The antistatic hard coat layer is formed by coating a coating liquid for forming an antistatic hard coat layer, and it is noted that the component of the solid content of the coating liquid for forming an antistatic hard coat layer other than the conductive particles corresponds to a binder matrix forming material.

It is a feature of the anti-reflection film of the present invention that the conductive particles are unevenly distributed to the low refractive index layer 13 side in the layer thickness direction so that a localized layer 12c is formed. The uneven distribution of the conductive particles in the layer thickness direction makes it possible to provide a high level of antistatic function to the antistatic hard coat layer with a small amount of particles content in the antistatic hard coat layer as a whole. On the other hand, the mixed layer 12a, which is located in the transparent substrate 11 side of the antistatic hard coat layer, includes few conductive particles. In the antistatic hard coat layer 12 in the anti-reflection film 1 of the present invention, the localized layer 12c includes conductive particles and the binder matrix while the mixed layer 12a includes the binder matrix and transparent substrate component along with few conductive particles.

The refractive index gradually changes from a value of the refractive index of the transparent substrate 11 to a value of the refractive index of the binder matrix contained in the antistatic hard coat layer 12 in the thickness direction of the mixed layer 12a from the transparent substrate 11 side toward the antistatic hard coat layer 12 side. In other words, the binder matrix and the transparent substrate component are mixed together with an inclined blend ratio in the mixed layer.

It is possible in the anti-reflection film of the present invention to prevent interference fringe caused by a difference in refractive index between the antistatic hard coat layer and the transparent substrate by arranging the mixed layer 12a which has an inclined refractive index changing gradually from a value of the transparent substrate 11 to a value of the binder matrix in the antistatic hard coat layer 12. In addition, the mixed layer 12a can improve adhesiveness between the transparent substrate 11 and the antistatic hard coat layer 12.

Figure 5A:
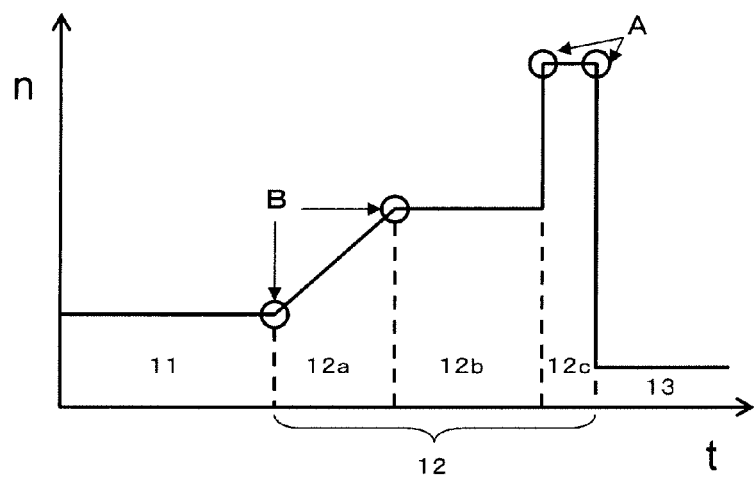
FIG. 5A to FIG. 5C are exemplary diagrams of a refractive index variation in an anti-reflection film of the present invention.
Figure 5B:
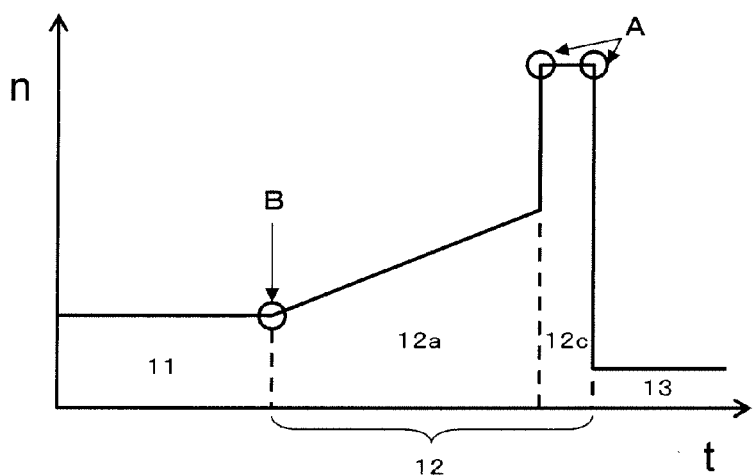
Figure 5C:
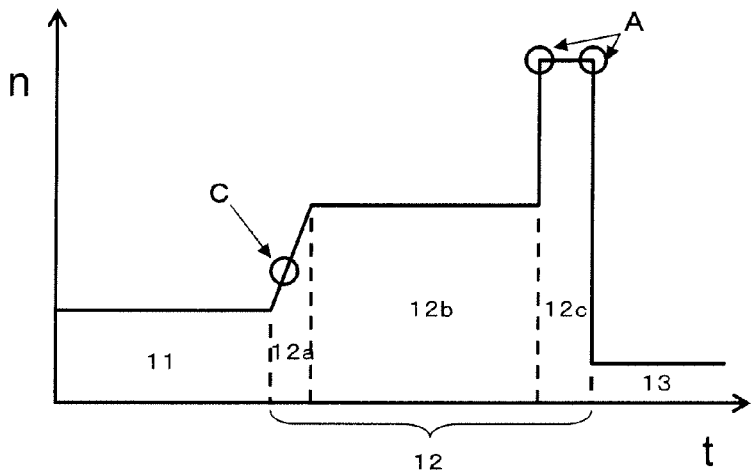

FIG. 5A to FIG. 5C exemplary illustrates a variation of refractive index along a location in the anti-reflection film thickness direction. In FIG. 5, the vertical axis represents refractive index (n) and the perpendicular axis represents the location in the anti-reflection film thickness direction. As the location in FIG. 5A to FIG. 5C moves from left to right, the indicated location changes from the transparent substrate 11 side to the surface of the antistatic hard coat layer 12 (localized layer 12c side).

The anti-reflection film of the present invention has at least antistatic hard coat layer 12 and low refractive index layer 13, and the antistatic hard coat layer 12 has the mixed layer 12a, in which the transparent substrate component and the binder matrix are mixed together with a blend ratio varying with a gradient, and the localized layer 12c, which includes the binder matrix and the conductive particles (FIG. 5A and FIG. 5B).

The localized layer is optically distinguishable. "Optically distinguishable" means such a state that when a spectral reflectance of the anti-reflection film of the present invention is obtained using visible light (wavelength in the range of 380-800 nm) with 5 degrees of incident angle from the low refractive index layer side and an optical simulation is performed on this spectral reflectance, an interference peak caused by the localized layer 12c besides a peak of the low refractive index layer can be observed.

Ordinarily, in manufacturing an anti-reflection film etc. a thickness of each functional layer (a hard coat layer and an antistatic layer etc.) can be estimated by a composition of coating liquid and coating amount per unit area. Since this is also true in the anti-reflection film of the present invention, the thickness of the antistatic hard coat layer can be predicted. The result of simulation, however, actually turns out a peak which suggests a thickness significantly thinner than the predicted thickness (hereafter called "envisioned thickness"). Thus, it is clear that the peak is caused by the localized layer 12c (or the peak certifies the presence of the localized layer). Then, this result further implies the presence of other layers having a thickness corresponding to a difference between the envisioned thickness and the thickness of the localized layer.

These "other layers" include the mixed layer 12a, in which the binder matrix component of the antistatic hard coat layer and the transparent substrate component are mixed with inclined ratio, in the anti-reflection film of the present invention. Since these "other layers" include the transparent substrate component other than the binder matrix, strictly speaking, the thickness of the "other layers" is thicker than the thickness corresponding to a difference between the envisioned thickness (of the antistatic hard coat layer 12) and the thickness of the localized layer 12c.

In the case where an interference peak which corresponds to the envisioned thickness (of the antistatic hard coat layer 12) is obtained from the spectral reflectance of the anti-reflection film, "other layers" which include not only binder matrix but also the transparent substrate component are supposed to be absent, which means no mixed layer 12a exists.

In the mixed layer 12a, the binder matrix (which is derived from the antistatic hard coat layer 12) and the component derived from the transparent substrate 11 are mixed together with a blend ratio varying with a gradient so that there are no acute changes in the refractive index (reference FIGS. 5A and 5B). Therefore, it is possible to prevent interference caused by a difference in refractive index between both adjacent layers to the mixed layer 12a (namely, the transparent substrate 11 and the intermediate layer 12b in FIG. 5A, or the transparent substrate 11 and the localized layer 12c in FIG. 5B etc.) so that an anti-reflection film of the present invention is provided with excellent optical properties. Such prevention of interference leads to an "optically indistinguishable" state (that is, a corresponding peak is undetectable by a spectral reflectance measurement).

The (antistatic) hard coat layer provides the anti-reflection film with a hard coat function by containing a certain amount (or more) of the binder matrix component which has hard coating properties. Regarding the anti-reflection film of the present invention, the binder matrix component is included in the localized layer 12c and the mixed layer 12a, respectively, in the antistatic hard coat layer. In the case where there is too much transparent substrate component in the mixed layer, however, the hard coat function may not be achieved sufficiently since the binder matrix is excessively diluted with the transparent substrate component.

Figure 2:
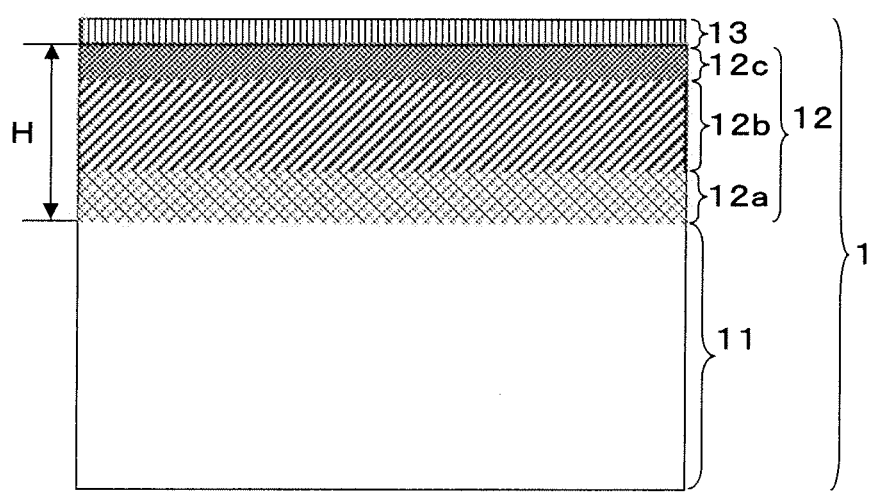
FIG. 2 shows a cross sectional exemplary diagram of an anti-reflection film of the present invention.

Thus, it is preferred to form an intermediate layer 12b between the localized layer 12c and the mixed layer 12a (reference FIG. 2 and FIG. 5A). Since the intermediate layer 12b has a higher concentration of binder matrix component which gives a hard coat function than the mixed layer 12a and an almost constant composition ratio throughout the layer, it is possible to steadily provide a hard coat function to the anti-reflection film of the present invention. It is further preferable that the intermediate layer 12b includes 95% by weight or more of binder matrix so as to achieve a hard coat function with certainty.

In addition, when the intermediate layer 12b includes binder matrix by a ratio of 95% by weight or more, the localized layer 12c is supposed to include conductive particles with a significantly high ratio (in other words, the conductive particles are highly concentrated in the localized layer) and it is possible to improve the anti-reflection effect and the antistatic effect of the anti-reflection film of the present invention.

This intermediate layer 12b is also included in the antistatic hard coat layer 12 and is regarded as one of the "other layers".

The amount of the binder matrix present in each layer included in the antistatic hard coat layer 12 of the anti-reflection film of the present invention can be measured by fluorescent X-ray analysis and Raman spectrum analysis.

The abundance (content ratio) of the conductive particles in each layer is measurable by a fluorescent X-ray analysis. In addition, the abundance (content ratio) of the transparent substrate component in each layer can be obtained from a measurement of a cross section profile by Raman spectrum analysis. Thus, the abundance (content ratio) of the binder matrix in each layer can be obtained by subtracting the abundance of the conductive particles and the transparent substrate component from the whole sample of each layer.

In this specification, a concentration of a component in each layer (the antistatic hard coat layer, the mixed layer, the intermediate layer and the localized layer) refers to an averaged concentration in the whole of the layer unless differently noticed. This is because the mixed layer has a varying concentration depending on the point of measurement and no fixed concentration can be obtained since it has a composition with a gradient.

Even in the case where only a significantly thin intermediate layer 12b is formed between the localized layer 12c and the mixed layer 12a (reference FIG. 5B), amount of binder matrix in the upper part (which is adjacent to the localized layer) of the mixed layer may be sufficient to provide hard coat properties according to circumstances. It is preferable, however, that a thickness of the intermediate layer in the anti-reflection film of the present invention is 2 μm or more in order to certify more steady hard coat properties. Although there is no upper limit to the thickness of the intermediate layer, it is preferable that the combined thickness of the intermediate layer and the antistatic hard coat layer is about 15 μm or less because plastic properties are lost and unnecessary material costs are required in the case where the combined thickness is too thick.

The compositions of the intermediate layer 12b and the mixed layer 12a are different although the type of the materials contained in the intermediate layer component and the mixed layer component are almost the same. The mixed layer 12a has composition which varies with a gradient in the layer thickness direction and there are no acute changes in refractive index as described above. Accordingly, the mixed layer 12a itself is always optically indistinguishable. In contrast, the intermediate layer 12b does not have a composition gradient (FIG. 5A). It is true that, strictly speaking, there may be a composition gradient, but it is such a small gradient that the interference peak caused by the intermediate layer and the adjacent layer does not disappear. Hence, whether the intermediate layer 12b is optically distinguishable or not depends on the state of the adjacent layer In the case where the mixed layer 12a is extremely thin and the intermediate layer 12b is thick, the difference in refractive index between both adjacent layers is no longer completely absorbed in the mixed layer 12a and the interference peak becomes detectable. In fact, as in the case of the localized layer, it is possible to observe an interference peak caused by the intermediate layer 12b along with peaks of the low refractive index layer 13 and the localized layer 12c when an optical simulation is conducted on a spectral reflectance of visible light (wavelength in the range of 380-800 nm) with 5 degrees of an incident angle from the low refractive index layer 13 side.

The term optically indistinguishable does not mean a state whereby the mentioned layer is not formed.

In the case where the anti-reflection film has an optically distinguishable intermediate layer 12b, it is possible to check whether the anti-reflection film also has a mixed layer 12a by a measurement of the spectral reflectance. When spectral reflectance of an anti-reflection film having an optically distinguishable intermediate layer is measured, a clear interference peak indicating a layer significantly thinner than the "envisioned thickness" and a vague peak indicating a layer slightly thinner than the "envisioned thickness" are observed (FIG. 5C). The former peak is indicating the localized layer 12c as described above. As described above, since the "other layers" which should include the mixed layer 12a and the intermediate layer 12b is thicker than the difference between the "envisioned thickness" of the antistatic hard coat layer and the thickness of the localized layer 12c, the result is that the latter peak suggests an existence of the intermediate layer 12c and the rest suggests an existence of the mixed layer 12a.

While an anti-reflection film having such a layer structure (which includes an optically distinguishable intermediate layer) certainly has hard coat properties, the film adversely has undesirable optical properties and an interference fringe is also generated.

Hence, it is preferable that an anti-reflection film of the present invention has an optically indistinguishable intermediate layer in addition to an optically indistinguishable mixed layer and an optically distinguishable localized layer as the antistatic hard coat layer.

If the mixed layer 12a has a sufficient thickness, it is possible to suppress interferences caused by differences in refractive index between both adjacent layers and the mixed layer. Then, the intermediate layer becomes optically indistinguishable so that the interference peak can not be detected (FIG. 5A).

As a result of having an optically indistinguishable intermediate layer, it becomes possible to prevent interference and yet keep hard coat properties.

It is preferable that the mixed layer has a thickness of 0.5 μm or higher in order to make the intermediate layer optically indistinguishable. It is true that the thicker the mixed layer is the better from a viewpoint of preventing interference peak. However, a mixed layer which is too thick leads to a decrease in a ratio of the binder matrix and adversely affects the hard coat properties. Thus, it is preferable that the thickness of the mixed layer is 10 μm or lower and furthermore, 5 μm or lower is more preferable from the viewpoint of arranging an intermediate layer.

Even in the case where the mixed layer and the intermediate layer are optically indistinguishable, the existence of these layers can be presumed by considering the difference between the "envisioned thickness" of the antistatic hard coat layer and the thickness of the localized layer obtained from the optical simulation of the spectral reflectance. Moreover, by measuring a cross-section profile by Raman spectral analysis, it is possible to confirm the existence of the mixed layer and the intermediate layer, and furthermore, it is possible to confirm the fact that the mixed layer has a composition varying with a gradient while the intermediate layer has an almost constant composition.

It is a feature of the anti-reflection film of the present invention that the antistatic hard coat layer 12 has both a mixed layer 12a which is optically indistinguishable and a localized layer 12c which is optically distinguishable. In addition, it is a feature of the present invention that an optical thickness (nd) of the localized layer 12c is in the range of 50-400 nm. The optical thickness (nd) is obtained by multiplying the thickness (d) of the layer by the refractive index (n) of the layer.

In the anti-reflection film of the present invention, the localized layer 12c, which is formed by localizing many of the conductive particles in the anti-reflection film surface side in the antistatic hard coat layer, is optically distinguishable and works as a high refractive index layer. At this time, the result of the spectral reflectance measured from the low refractive index layer side can be observed as not a spectral reflectance curve of a double layer of the low refractive index layer and the antistatic hard coat layer but a spectral reflectance curve of a double layer of the low refractive index layer and the localized layer.

The anti-reflection film of the present invention, in which a part of the antistatic hard coat layer (namely, the localized layer 12c) works as a high refractive index layer, has better optical properties than the anti-reflection film in which the anti-reflection function is achieved by only the low refractive index layer and the hard coat layer or by the low refractive index layer and (the whole of) the antistatic hard coat layer. In the anti-reflection film of the present invention, it is possible to further decrease visible light reflectance and reflectance in a wide range of wavelength region on the anti-reflection film surface by an optical double layer structure of high refractive index/low refractive index layers so that the reflection light becomes colorless.

It is difficult to make the refractive index of the localized layer 12c smaller than that of the mixed layer 12a and the intermediate layer 12b in the anti-reflection film 1 of the present invention due to a limitation concerning material. This is because the conductive particles, which are contained in the antistatic hard coat layer and localized in the localized layer, have a higher refractive index than the binder matrix.

It is a feature in the anti-reflection film 1 of the present invention that a difference in refractive index between the localized layer 12c and the intermediated layer 12b is in the 0.01-0.05 range. As this difference is in this range, the localized layer has a sufficient high refractive index function and the anti-reflection film is provided with an excellent anti-reflection function. It is true that even when the difference is lower than 0.01, the localized layer might be optically distinguishable by a difference in refractive index between the localized layer 12c and the mixed layer 12a and the localized layer may work as a high refractive index layer, but the localized layer 12c is preferred to be used more as a high refractive index layer if the intermediate layer 12b is arranged and the difference in refractive index between the localized layer 12c and the intermediated layer 12b is 0.01 or more. On the other hand, if the difference in refractive index exceeds 0.05, a large amount of conductive particles have to be added in order to form the localized layer 12c and the resultant anti-reflection film may have a low visible light transmittance.

In addition, it is a feature in the antireflection film 1 of the present invention that the optical thickness of the localized layer 12c in the range of 50-400 nm. If the optical thickness is smaller than 50 nm, only insufficient conductivity for the antistatic function may be obtained or the localized layer 12c can not work as a high refractive index layer of the anti-reflection film. On the other hand, if the optical thickness exceeds 400 nm, interference fringes are generated resulting in a defective appearance.

The optical thickness and refractive index of each layer can be obtained by an optical simulation method from a spectral reflectance curve measured at an incident angle of 5 degrees from the low refractive index side of the anti-reflection film using a spectral photometer. The obtained refractive index of each layer in this way is an averaged value. The refractive index in this specification means an averaged refractive index obtained in this way unless otherwise noted.

It is noted that the localized layer 12c is referred to as being preferably "optically distinguishable" particularly in the case where the intermediate layer 12b is arranged and optically indistinguishable, and if the refractive index of the localized layer 12c which is obtained by the optical simulation method from a spectral reflectance curve is larger than the refractive index of the intermediate layer 12b by a difference in the range of 0.01-0.05 and the optical thickness of the localized layer 12c is in the range of 50-400 nm, It is still further preferable in the anti-reflection film of the present invention that the localized layer 12c has an optical thickness in the range of 200-350 nm. It is possible to make the localized layer 12c a high refractive index layer having optical thickness of half a wavelength of visible light by adjusting the optical thickness of the localized layer in the range of 200-350 nm. It is possible to decrease light reflectance of the anti-reflection film and provide a colorless anti-reflection film with no color unevenness by combining the low refractive index layer and the localized layer, which is a high refractive index layer having an optical thickness in the range of 200-350 nm, together in this way. If the optical thickness of the localized layer 12c is smaller than 200 nm, it may be difficult to reduce coloring and color unevenness. On the other hand, if the optical thickness of exceeds 350 nm, interference fringes may be generated.

The color unevenness in the present invention means unevenness in reflection color caused by thickness unevenness in the high refractive index layer and the low refractive index layer, and a large degree of color unevenness results in a defective appearance. Interference fringe is a certain type of color unevenness which is caused by an optical interference (mainly relating to a difference in refractive index between the substrate and the hard coat layer etc.) and a phenomenon which is observed as a rainbow-like color unevenness caused by a plurality of optical interferences if the layer thickness is large.

In addition, it is preferable in the anti-reflection film of the present invention that a conductive particle content ratio in the antistatic hard coat layer 12 is in the range of 0.5-5.0% by weight and conductive particle content in a unit area of the antistatic hard coat layer is in the range of 0.05-0.50 g/m$^2$. It is possible in the present invention to obtain a sufficient antistatic property and prevent a fall in visible light transmittance of the anti-reflection film caused by an addition of conductive particles by forming the localized layer 12c with a low level of the conductive particle content ratio (in other words, a relatively small conductive particle content) localizing conductive particles in the antistatic hard coat layer into a region of the low refractive index layer side.

In the case where the conductive particle content ratio in the antistatic hard coat layer 12 is smaller than 0.5% by weight, the anti-reflection film possibly fails to obtain a sufficient antistatic property because it might be impossible to localize a sufficient amount of conductive particles in the localized layer. On the other hand, in the case where the conductive particle content ratio exceeds 5.0% by weight, the visible light transmittance of the resultant anti-reflection film may be insufficient and in addition have high costs. In the case where the conductive particle content in a unit area of the antistatic hart coat layer is smaller than 0.05 g/m$^2$, the anti-reflection film may have only an insufficient antistatic property because it is impossible to localize a sufficient amount of the conductive particles in the localized layer. On the other hand, in the case where the conductive particle content in a unit area of the antistatic hart coat layer exceeds 0.50 g/m$^2$, the resultant anti-reflection film may have insufficient visible light transmittance.

The conductive particle content ratio (% by weight) and the conductive particle content in a unit area (g/m$^2$) can be obtained by calculation from the material used in production. In addition, it is possible to measure the conductive particle content (% by weight) in each layer included in the antistatic hard coat layer using a finished product of the anti-reflection film by, for example, fluorescent x-ray analysis. Using this conductive particle content (% by weight) in each layer and each layer thickness, it is possible to obtain the conductive particle content in a unit area (g/m$^2$).

In addition, it is preferable in the anti-reflection film of the present invention that the thickness of the antistatic hard coat layer is in the range of 3-15 μm. In the case where the thickness is smaller than 3 um, the anti-reflection film may fail to have sufficient hardness since the antistatic hard coat layer has only insufficient hard coat properties. In order to obtain sufficient hard coat properties, the antistatic hard coat layer (the mixed layer, the intermediate layer and the localized layer) preferred to have a thickness more than 3 μm or an intermediate layer with a thickness of 2 μm. In addition, although there is no upper limit from the viewpoint of optical properties, the antistatic hard coat layer is preferred to have a thickness of at most 15 μm because high costs are required and plastic properties are liable to be lost if the layer is too thick. In the case where the thickness of the antistatic hard coat layer exceeds 15 μm, there are problems that the anti-reflection layer curls excessively by shrinkage as hardening and thus that the processability will be lost and cracks are liable to be produced in the latter processes.

In addition, it is preferable in the present invention that a parallel light transmittance of the anti-reflection film is in the range of 93.0-97.0% and a surface resistivity on the low refractive index layer of the anti-reflection film is in the range of $1.0\times10^6$-$1.0\times10^{11}$Ω/□. In the present invention, it is possible to achieve both a high level of visible light transmittance and sufficient antistatic properties by adding a small amount of conductive particles to the antistatic hard coat layer, localizing the conductive particles and forming the localized layer 12c. In the case where the parallel light transmittance of the anti-reflection film is less than 93.0%, it may be impossible to make an anti-reflection film having sufficient visible light transmittance. On the other hand, it is difficult to manufacture an anti-reflection film with a parallel light transmittance of more than 97.0%. In the case where the surface resistivity on the low refractive index layer exceeds $1.0\times10^{11}$Ω/□, it is impossible to provide the anti-reflection film with sufficient antistatic properties. In addition, it is difficult to make the surface resistivity on the surface of the low refractive index layer smaller than $1.0\times10^6$Ω/□ when the parallel light transmittance of the anti-reflection film is more than 93.0%.

In addition, it is preferable in the present invention that an average luminous reflectance on the surface of low refractive index layer side of the anti-reflection film is in the range of 0.5-1.5% and a reflection hue in the L*a*b* coordination system on the surface of the low refractive index layer side of the anti-reflection film satisfies 0.00≦a*≦3.00 and −3.00≦b*≦3.00. It is possible in the present invention to provide the anti-reflection film with excellent optical properties by making the localized layer work as a high refractive index layer. It is possible to provide the anti-reflection film with sufficient anti-reflection properties by making the average luminous reflectance on the low refractive index layer surface in the range of 0.5-1.5%.

In the case where the average luminous reflectance on the low refractive index layer surface exceeds 1.5%, it is impossible to provide the anti-reflection film with sufficient anti-reflection properties. On the other hand, it is difficult to obtain an anti-reflection film having an average luminous reflectance lower than 0.5% by an optical interference of two layers, namely, the localized layer 12c and the low refractive index layer 13.

The reflection hue becomes more colorless as each a* and b* approaches 0. A region −3.00≦a*≦0.00, however, corresponds to a region of green, in which the relative luminosity is large and an observer can easily perceive color. Hence, it is preferable that the anti-reflection film of the present invention satisfies 0.00≦a*≦3.00 and −3.00≦b*≦3.00. It is possible to provide an anti-reflection film on which an observer hardly perceives color if a* and b* are in these ranges.

In addition, it is preferable in the anti-reflection film of the present invention that the transparent substrate 11 is made of triacetyl cellulose film. Triacetyl cellulose film has only a weak birefringence and excellent transparency. Triacetyl cellulose film is preferably used as the transparent substrate especially in the case where the anti-reflection film of the present invention is applied on a liquid crystal display (LCD) device surface.

Next, a polarizing plate using an anti-reflection film of the present invention is described.

Figure 3:
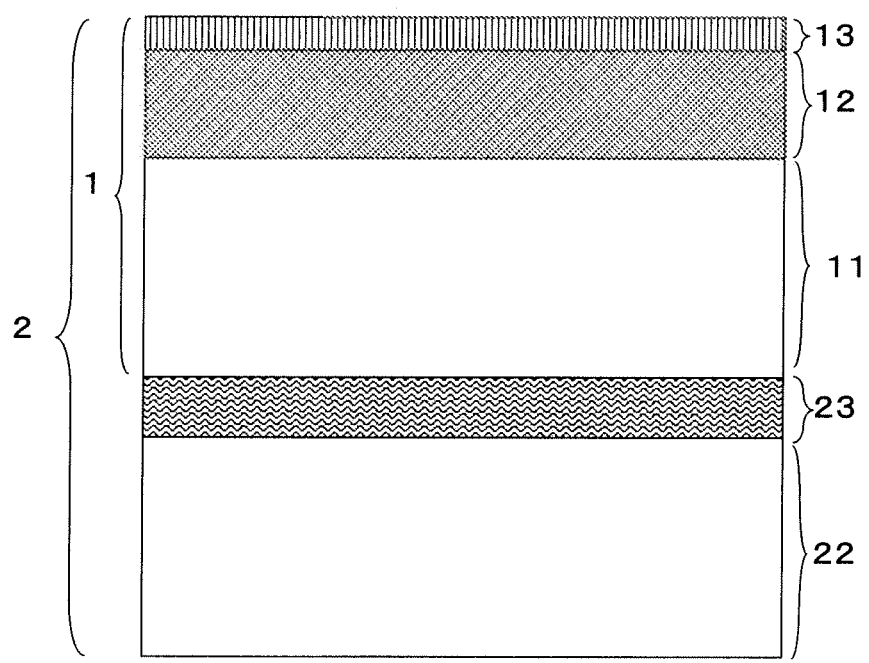
FIG. 3 shows a cross sectional exemplary diagram of a polarizing plate using an anti-reflection film of the present invention.

FIG. 3 shows a cross sectional exemplary diagram of a polarizing plate using an anti-reflection film of the present invention. The polarizing plate 2 has a structure in which a polarizing layer 23 is interposed between a pair of two transparent substrates (a first transparent substrate 11 and a second transparent substrate 22). In the polarizing plate 2 of the present invention, an antistatic hard coat layer 12 and a low refractive index layer 13 are arranged on one of the surfaces of the first transparent substrate 11 of the anti-reflection film 1 of the present invention. Moreover, a polarizing layer 23 and a transparent substrate 22 are formed in order on the other surface of the first transparent substrate 11. In other words, the first transparent substrate 11 of the anti-reflection film 1 of the present invention is also used as one of the transparent substrates which interpose the polarizing layer 23.

Subsequently, a transmission type LCD device which uses an anti-reflection film of the present invention is described.

Figure 4:
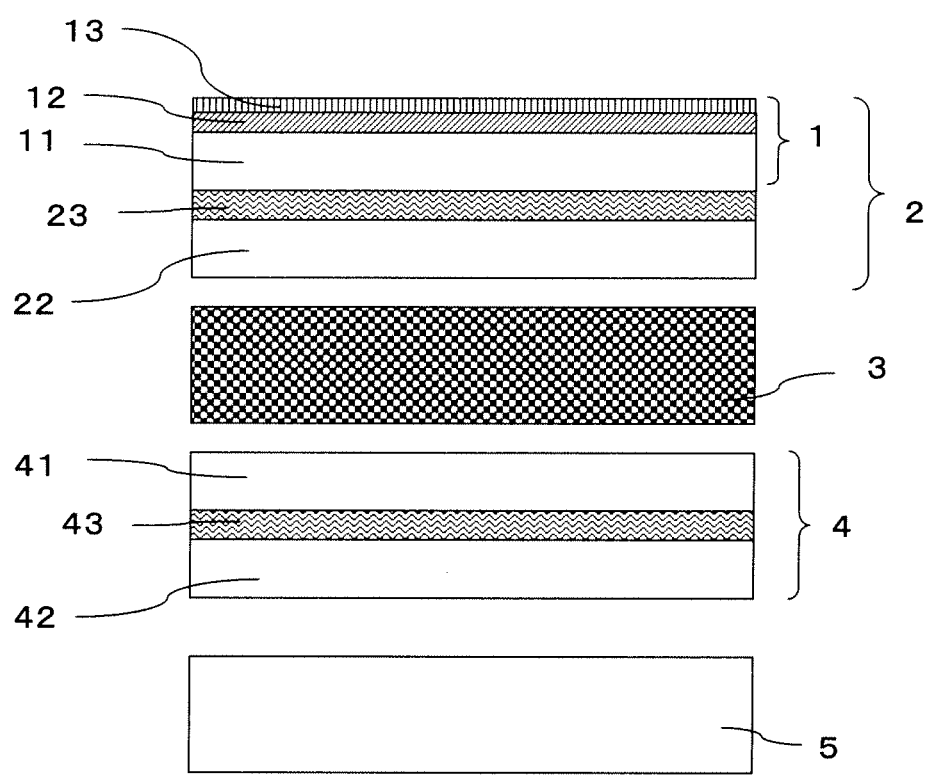
FIG. 4 shows a cross sectional exemplary diagram of an LCD having an anti-reflection film of the present invention.

FIG. 4 illustrates a cross sectional exemplary diagram of a transmission type LCD device using an anti-reflection film of the present invention. The transmission type LCD device of the present invention in FIG. 4 has a backlight unit 5, a second polarizing plate 4, a liquid crystal cell 3 and a first polarizing plate 2 which is a polarizing plate of the present invention and includes the anti-reflection film 1 in order. At this point, the side of the anti-reflection film is the surface of the display device, that is, the side of an observer.

The backlight unit 5 includes a light source and a light diffusion plate (Not shown in the figures). The liquid crystal cell 3 has a transparent substrate on which one electrode is formed, another transparent substrate on which the other electrode and a color filter are formed, and liquid crystal which is inserted and sealed between these electrodes (Not shown in the figures). The second polarizing plate 4 has an interposed structure of a second polarizing layer 43 between a third transparent substrate 41 and a fourth transparent substrate 42. The liquid crystal cell 3 is arranged between the first polarizing plate 2 and the second polarizing plate 4.

In addition, the transmission type LCD device also includes other functional components. The functional components include, for example, a diffusion film, a prism sheet and a luminance improving film, which are useful for utilizing light from the backlight unit effectively, and a retardation film, which compensates a phase difference of a liquid crystal cell or a polarizing plate, but are not limited to these.

Next, a method for manufacturing an anti-reflection film of the present invention is described.

The manufacturing method includes a process of forming a coated layer by coating on the transparent substrate a coating liquid for forming a hard coat layer which contains a binder matrix forming material and conductive particles, a process of drying the coated layer, a process of irradiating ionizing radiation to form an antistatic hard coat layer, and a process of forming a low refractive index layer on the antistatic hard coat layer.

In the anti-reflection film of the present invention, it is possible to form a localized layer and a mixed layer by adding a solvent which dissolves the transparent substrate or causes the transparent substrate to swell to the coating liquid for forming an antistatic hard coat layer when forming the antistatic hard coat layer.

It is a feature of the manufacturing method of the anti-reflection film of the present invention that 30-90% by weight of the entire solvent contained in the coating liquid for forming an antistatic hard coat layer is a solvent which dissolves the transparent substrate or causes the transparent substrate to swell.

By using a solvent which dissolves the transparent substrate or causes the transparent substrate to swell as 30-90% by weight of the entire solvent contained in the coating liquid for forming an antistatic hard coat layer, it is possible to form a localized layer in which conductive particles are localized and a mixed layer in which the binder matrix component and the transparent substrate component blend together with a composition gradient.

The formation mechanism of the localized layer in this manufacturing method of the anti-reflection layer of the present invention is still not completely clear. It is assumed that as the solvent which dissolves the transparent substrate or causes the transparent substrate to swell seeps into the transparent substrate, the binder matrix component also seeps into the transparent substrate and blends together with the transparent substrate component to form a mixed layer while the conductive particles move in the opposite direction from the transparent substrate and are segregated to form a localized layer because the conductive particles hardly seep into the transparent substrate component.

It is also possible to form the intermediate layer which is formed between the transparent substrate and the antistatic hard coat layer and has a composition of the transparent substrate component and the binder matrix component by using the solvent which dissolves the transparent substrate or causes the transparent substrate to swell as 30-90% by weight component of the entire solvent contained in the coating liquid for forming an antistatic hard coat layer.

In the case where the solvent which dissolves the transparent substrate or causes the transparent substrate to swell is used only less than 30% by weight of the entire solvent contained in the coating liquid for forming an antistatic hard coat layer, it becomes impossible to form an optically distinguishable localized layer. Whereas in the case where the solvent which dissolves the transparent substrate or causes the transparent substrate to swell is used more than 90% by weight of the entire solvent, there may be problems such as a hardness decrease of the anti-reflection film caused by an increase in thickness of the mixed layer, and an excessive haze generation due to an aggregation of conductive particles in the localized layer.

It is more preferable in the manufacturing method of the anti-reflection film of the present invention that 40-80% by weight of the entire solvent contained in the coating liquid for forming an antistatic hard coat layer is a solvent which dissolves the transparent substrate or causes the transparent substrate to swell. It is still more preferable in the manufacturing method of the anti-reflection film of the present invention that 50-70% by weight of the entire solvent contained in the coating liquid for forming an antistatic hard coat layer is a solvent which dissolves the transparent substrate or causes the transparent substrate to swell.

In addition, it is preferable in the manufacturing method of the anti-reflection film of the present invention that the time required for the solvent to evaporate to 10% by weight or less in the coating liquid on the transparent substrate is in the range of 2-60 seconds. The solvent, herein, means the solvent mixture in which a solvent which dissolves the transparent substrate or causes the transparent substrate swollen is also included.

By setting the time for the solvent to evaporate to 10% by weight or less in the coating liquid coated on the transparent substrate to 2-60 seconds, it becomes possible to localize the conductive particles in the coating liquid to form the localized layer spending sufficient time so that the anti-reflection film of the present invention having the localized layer and the mixed layer is easily manufactured. In the case where it takes less than two seconds for the solvent in the coating liquid to reduce to 10% by weight or less, the localized layer may not be formed due to a rapid drying of the coated layer. In addition, the antistatic hard coat layer is formed continuously by a roll-to-roll system in the anti-reflection film of the present invention. If it takes more than 60 seconds for the solvent in the coating liquid to reduce to 10% by weight or less, it takes too much time to form the layer practically. When a single film production system is applied instead of the roll-to-roll system, it is similarly undesirable because of the long takt time and low productivity.

The amount of solvent contained in the coated layer can be obtained by measuring a weight. In addition, a solvent contained in the coated layer can also be measured by an infrared monitoring.

In addition, it is preferable in the manufacturing method of the anti-reflection film of the present invention that the total amount of the solvent contained in the coating liquid for forming the antistatic hard coat layer is in the range of 55-85% by weight. By adjusting the total amount of the solvent contained in the coating liquid into such a range, it becomes possible to ensure sufficient time to localize the conductive particles in the coated layer to form the localized layer and to easily manufacture the anti-reflection film with the localized layer and the mixed layer of the present invention. In the case where the amount of solvent in the coating liquid for forming the antistatic hard coat layer is less than 55% by weight, it may be impossible to form the localized layer because of rapid drying of the coated layer. On the other hand, in the case where the amount of solvent in the coating liquid for forming the antistatic hard coat layer exceeds 85% by weight, it is necessary to increase drying time, which is unsuitable for a mass production.

In addition, it is preferable in the manufacturing method of the anti-reflection film of the present invention that the drying process of the coated layer which is supposed to be the antistatic hard coat layer is performed under a solvent atmosphere in the concentration range 0.2-10 vol %. By drying the coated layer under a solvent atmosphere in the range of 0.2-10 vol %, it is possible to ensure sufficient time to localize the particle in the coated layer to form the localized layer and to easily manufacture the anti-reflection film with the localized layer and the mixed layer. At this time, at least one solvent among solvents contained in the coating liquid for forming the antistatic hard coat layer is used as a solvent of the drying atmosphere. In the case where the solvent atmosphere is thinner than 0.2 vol %, the coated layer may dry too rapidly to form the localized layer. On the other hand, in the case where the solvent atmosphere is thicker than 10 vol %, it is necessary to set a long drying time, which is unsuitable for mass production.

In addition in the manufacturing method of the anti-reflection film of the present invention, a drying process is performed after the coating liquid for forming the antistatic hard coat layer is coated on the transparent substrate. It is preferable that this drying process includes a primary drying at a temperature in the range of 20-30° C. just after the coating of the coating liquid for forming the antistatic hard coat layer. By setting the primary drying temperature in the range of 20-30° C., it is possible to ensure sufficient time to localize the conductive particles in the coated layer to form the localized layer and is it easily possible to manufacture the anti-reflection film having the localized layer and the mixed layer of the present invention. In the case where the drying temperature exceeds 30° C., it may be impossible to form the localized layer because of rapid drying of the coated layer. On the other hand, in the case where the drying temperature is lower than 20° C., it is necessary to set a long drying time, which is unsuitable for continuous production. Since the primary drying alone may be insufficient, an appropriate heat drying at a drying temperature in the range of 50-150° C. is preferred to be added as a secondary drying.

In addition, it is preferable that the primary drying is performed for a time in the range of 2-60 seconds. If it takes less than 2 seconds to perform the primary drying, it may be impossible to form the localized layer because of rapid drying. In addition, the anti-reflection film of the present invention is manufactured by a roll-to-roll system. If it takes more than 60 seconds to perform the primary drying, it is necessary to decrease a feeding rate or to arrange a long drying box, which is unpractical.

A volatile solvent with a high boiling point is preferred to be used as a solvent contained in the coating liquid for forming the antistatic hard coat layer. A solvent with a boiling point of 100° C. or higher is preferable and 200° C. or higher is more preferable. This is because the higher the boiling point, the easier the adjustment of primary drying time, which is essential for forming the mixed layer and the intermediate layer, becomes.

In addition, it is preferable in the present invention that the solvent contained in the coating liquid for forming the antistatic hard coat layer contains N-methylpyrrolidone when triacetyl cellulose is used as the transparent substrate. It becomes possible to easily manufacture the anti-reflection film of the present invention having the localized layer and the mixed layer by adding N-methylpyrrolidone as a solvent contained in the coating liquid for forming the antistatic hard coat layer because N-methylpyrrolidone has a high boiling point and is extremely compatible with triacetyl cellulose.

The anti-reflection film and its manufacturing method of the present invention are described further in detail.

Films or sheets made of various organic polymers can be used as the transparent substrate of the anti-reflection film in the present invention. For example, substrates which are ordinarily used for an optical component of a display device, specifically, an organic polymer of polyolefin such as polyethylene and polypropylene etc., polyester such as polyethylene terephthalate and polyethylene naphthalate etc., cellulose such as triacetyl cellulose, diacetyl cellulose and cellophane etc., a polyamide such as 6-nylon and 6,6-nylon etc., acrylate such as polymethyl methacrylate etc., polystyrene, polyvinyl chloride, polyimide, polyvinyl alcohol, polycarbonate, and/or ethylene vinyl alcohol etc. can be used considering their optical properties such as transparency and refractive index etc. along with other characteristics such as impact resistivity, heat resistance and endurance etc. In particular, polyethylene terephthalate, triacetyl cellulose, polycarbonate and polymethyl methacrylate are desirable. Among them, a triacetyl cellulose film is preferred to be used when the anti-reflection film of the present invention is applied on an LCD because triacetyl cellulose has significantly small birefringence and good transparency.

It is preferable that the thickness of the transparent substrate is in the range of 25-200 μm, and in particular 40-80 μm is more preferable.

Moreover, functional materials obtained from these organic polymers by adding a known additive such as, for example, ultraviolet absorber, infrared absorber, plasticising agent, lubricant, colorant, antioxidant and flame retardant etc. can also be used. In addition, the transparent substrate is not necessarily made from only one of the organic polymers but also a mixture or a copolymer of two or more of these. The transparent substrate may have a stacked structure of a plurality of sub-layers.

Next, a forming method of the antistatic hard coat layer is described. The antistatic hard coat layer can be formed by coating a coating liquid containing conductive particles, a binder matrix forming material and a solvent on the transparent substrate to form a coated layer which is going to be the antistatic hard coat layer on the transparent substrate, followed by drying the coated layer and then irradiating ionizing radiation such as ultraviolet ray (UV) and an electron beam to cure the coated layer.

Electron type conducting particles such as indium oxide, indium oxide-tin oxide (ITO), tin oxide, antimony oxide-tin oxide (ATO), phosphor-doped tin oxide (PTO), fluorine-doped tin oxide (FTO), zinc oxide, zinc oxide-aluminum oxide (AZO) and zinc oxide-gallium oxide (GZO) etc. can be preferably used as the conductive particles contained in the coating liquid for forming an antistatic hard coat layer of the present invention. It is necessary to add conductive particles to the hard coat layer in order to provide the hard coat layer with the antistatic function. At this time, the conductive particles added to the hard coat layer are divided into two types, that is, electron type conducting particles and ion type conducting particles. The electron type conducting particles perform antistatic function more stably even under a low humidity condition. In addition, when the binder matrix, which is contained in the antistatic hard coat layer, seeps into the transparent substrate, the conductive particles are pushed aside from a portion of the binder matrix component (the mixed layer and the intermediate layer) which blends together with the transparent substrate component because the conductive particles are hardly dispersed into the transparent substrate component. As a result, the localized layer is formed.

It is preferable that the conductive particles which are contained in the coating liquid for forming the antistatic hard coat layer of the present invention have a particle size in the range of 1-100 nm in diameter. In the case where the particle size exceeds 100 nm, the antistatic hard coat layer becomes white and the visible light transmittance of the anti-reflection film is liable to decrease because of strong light reflection by Rayleigh scattering. In addition, in the case where the particle size exceeds 100 nm, the haze of the anti-reflection film increases and it becomes difficult to make the haze 0.5 or less. On the other hand, in the case where the particle size is less than 1 nm, there may be problems that the surface resistivity of the anti-reflection film becomes high and the conductivity drops, and the particles agglutinate together and a dispersion state in the antistatic layer becomes uneven. A plurality of types (in material and size) of particles may be used although it is not necessary.

The binder matrix forming material which is used to form the antistatic hard coat layer includes an ionizing radiation curable material. Acrylic materials can be used as the ionizing radiation curable material. A monofunctional or polyfunctional acrylate (or methacrylate) such as acrylic (or methacrylic) ester of polyol, or polyfunctional urethane acrylate (or methacrylate) synthesized from diisocyanate and hydroxyester of polyol and acrylic (or methacrylic) acid etc. can be used as the acrylic material. Besides these, polyether resin, polyester resin, epoxy resin, alkyd resin, spiroacetal resin, polybutadiene resin and polythiol-polyene resin etc. which have an acrylic functional group can also be used as the ionizing radiation curable resin.

Acrylate (or methacrylate) in this specification of the present invention indicates both acrylate and methacrylate. For example, urethane acrylate (or methacrylate) means both urethane acrylate or urethane methacrylate.

The following materials are examples of monofunctional acrylate (or methacrylate): 2-hydroxyethyl acrylate (or methacrylate), 2-hydroxypropyl acrylate (or methacrylate), 2-hydroxybutyl acrylate (or methacrylate), n-butyl acrylate (or methacrylate), isobutyl acrylate (or methacrylate), t-butyl acrylate (or methacrylate), glycidyl acrylate (or methacrylate), acryloylmorpholine, N-vinylpyrrolidone, tetrahydrofurfuryl acrylate, cyclohexyl acrylate (or methacrylate), 2-ethylhexyl acrylate (or methacrylate), isobornyl acrylate (or methacrylate), isodecyl acrylate (or methacrylate), lauryl acrylate (or methacrylate), tridecyl acrylate (or methacrylate), cetyl acrylate (or methacrylate), stearyl acrylate (or methacrylate), benzyl acrylate (or methacrylate), 2-ethoxyethyl acrylate (or methacrylate), 3-methoxybutyl acrylate (or methacrylate), ethyl carbitol acrylate (or methacrylate), phosphoric acrylate (or methacrylate), (ethylene oxide)-modified phosphoric acrylate (or methacrylate), phenoxy acrylate (or methacrylate), (ethylene oxide)-modified phenoxy acrylate (or methacrylate), (propylene oxide)-modified phenoxy acrylate (or methacrylate), nonylphenol acrylate (or methacrylate), (ethylene oxide)-modified nonylphenol acrylate (or methacrylate), (propylene oxide)-modified nonylphenol acrylate (or methacrylate), methoxydiethylene glycol acrylate (or methacrylate), methoxypolyethylene glycol acrylate (or methacrylate), methoxypropylene glycol acrylate (or methacrylate), 2-acryloyl (or methacryloyl) oxyethyl-2-hydroxypropyl phthalate, 2-hydroxyl-3-phenoxy propyl acrylate (or methacrylate), 2-acryloyl (or methacryloyl) oxyethyl hydrogen phthalate, 2-acryloyl (or methacryloyl) oxypropyl hydrogen phthalate, 2-acryloyl (or methacryloyl) oxypropyl hexahydrohydrogen phthalate, 2-acryloyl (or methacryloyl) oxypropyl tetrahydrohydrogen phthalate, dimethylaminoethyl acrylate (or methacrylate), trifluoroethyl acrylate (or methacrylate), tetrafluoropropyl acrylate (or methacrylate), hexafluoropropyl acrylate (or methacrylate), octafluoropropyl acrylate (or methacrylate), 2-adamantane, and an adamantane derivative monoacrylate (or methacrylate) such as adamantyl acrylate (or methacrylate) having monovalent monoacrylate (or methacrylate) which is derived from adamantane diol etc.

The following materials are examples of difunctional acrylate (or methacrylate): ethylene glycol diacrylate (or methacrylate), diethylene glycol diacrylate (or methacrylate), butanediol diacrylate (or methacrylate), hexanediol diacrylate (or methacrylate), nonanediol diacrylate (or methacrylate), ethoxylated hexanediol diacrylate (or methacrylate), propoxylated hexanediol diacrylate (or methacrylate), polyethylene glycol diacrylate (or methacrylate), tripropylene glycol diacrylate (or methacrylate), polypropylene glycol diacrylate (or methacrylate), neopentyl glycol diacrylate (or methacrylate), ethoxylated neopentyl glycol diacrylate (or methacrylate), and hydroxypivalic neopentyl glycol diacrylate (or methacrylate) etc.

The following materials are examples of acrylate (or methacrylate) having three or more acrylic functional groups: trifunctional acrylates (or methacrylates) such as trimethylolpropane triacrylate (or methacrylate), ethoxylated trimethylolpropane triacrylate (or methacrylate), propoxylated trimethylolpropane triacrylate (or methacrylate), tris(2-hydroxyethyl)isocyanate triacrylate (or methacrylate) and glycerin triacrylate (or methacrylate) etc., acrylates (or methacrylates) with three acrylic groups such as pentaerythritol triacrylate (or methacrylate), dipentaerythritol triacrylate (or methacrylate) and ditrimethylolpropane triacrylate (or methacrylate) etc., polyfunctional acrylates (or methacrylates) with more than three acrylic groups such as pentaerythritol tetraacrylate (or methacrylate), ditrimethylolpropane tetraacrylate (or methacrylate), dipentaerythritol tetraacrylate (or methacrylate), dipentaerythritol pentaacrylate (or methacrylate), ditrimethylolpropane pentaacrylate (or methacrylate), dipentaerythritol hexaacrylate (or methacrylate) and ditrimethylolpropane hexaacrylate (or methacrylate) etc., and polyfunctional acrylates (or methacrylates) which is obtained from these acrylates (or methacrylates) by substituting any part of these with an alkyl group or $\epsilon$-caprolactone etc.

Among various acrylic materials, polyfunctional urethane acrylates are preferably used because it is possible to easily control properties of the hard coat layer by designing molecular structure and adjusting the molecular weight to a desired scale. The urethane acrylates can be obtained by a reaction of polyol, polyvalent isocyanate and acrylate having a hydroxyl group. Although UA-306H, UA-306T and UA-306I etc. (made by Kyoeisha Chemical Co., Ltd.), UV-1700B, UV-6300B, UV-7600B, UV-7605B, UV-7640B and UV-7650B etc. (made by Nippon Synthetic Chemical Industry Co., Ltd.), U-4HA, U-4HA, U-6HA, UA-100H, U-6LPA, U-15HA, UA-32P and U-324A etc. (made by Shin-Nakamura Chemical Co., Ltd.), Ebecryl-1290, Ebecryl-1290K and Ebecryl-5129 etc. (made by Daicel-UCB Co., Ltd.), UN-3220HA, UN-3220HB, UN-3220HC and UN-3220HS etc. (made by Negami Chemical industrial Co., Ltd.) are specific examples, the present invention is not limited to these.

Besides these, polyether resin, polyester resin, epoxy resin, alkyd resin, spiroacetal resin, polybutadiene resin and polythiol-polyene resin etc. which have an acrylic functional group can also be used as the ionizing radiation curable resin.

In addition, in the case where the coating liquid for forming the antistatic hard coat layer is cured by ultraviolet light, a photopolymerization initiator is added to the coating liquid for forming the antistatic hard coat layer. The photopolymerization initiator is an additive which generates radicals as ultraviolet light is irradiated. For example, acetophenone, benzoin, benzophenone, phosphine oxide, ketals, anthraquinone and thioxanthone can be used as the photopolymerization initiator. In addition, the amount of photopolymerization initiator added to the coating liquid is preferably in the range of 0.1-10 parts by weight, and is more preferably 1-7 parts by weight relative to 100 parts by weight of ionizing radiation curable material.

The coating liquid for forming the antistatic hard coat layer contains a solvent. A solvent which dissolves the transparent substrate or causes the transparent substrate to swell is used by a ratio in the range of 30-80 wt % relative to the total solvent in the coating liquid for forming the antistatic hard coat layer of the present invention.

Ethers such as dibutyl ether, dimethoxymethane, dimethoxyethane, diethoxyethane, propylene oxide, dioxane, dioxolane, trioxane, tetrahydrofuran, anisole and phenetol etc., a certain type of ketones such as acetone, methyl ethyl ketone, diethyl ketone, dipropyl ketone, diisobutyl ketone, cyclopentanone, cyclohexanone and methylcyclohexanone etc., esters such as ethyl formate, propyl formate, n-pentyl formate, methyl acetate, ethyl acetate, methyl propionate, ethyl propionate, n-pentyl acetate and γ-butyrolactone etc., cellosolves such as methyl cellosolve, cellosolve, butyl cellosolve and cellosolve acetate etc., N-methyl-2-pyrrolydone (N-methylpyrrolydone) and dimethyl carbonate can be used as the solvent which dissolves the transparent substrate or causes the transparent substrate to swell when triacetyl cellulose is used as the transparent substrate. One of these or any combination of a plurality of these can be used as the solvent.

Alcohols such as ethanol and isopropyl alcohol etc., aromatic hydrocarbons such as toluene, xylene and cyclohexylbenzene etc., hydrocarbons such as n-hexane and cyclohexane etc., and a certain type of ketones such as methyl isobutyl ketone, methyl butyl ketone and diacetone alcohol etc. are a solvent which does not dissolve triacetyl cellulose nor cause triacetyl cellulose to swell. One of these or any combination of a plurality of these can be used as the solvent.

In addition, the binder matrix forming material may also include a thermoplastic resin besides the ionizing radiation curable material. Cellulose derivatives such as acetyl cellulose, nitrocellulose, acetyl butyl cellulose, ethylcellulose and methylcellulose etc., vinyl acetate and its copolymers, vinyl chloride and its copolymers, vinyl resins such as vinylidene chloride and its copolymers, acetal resins such as polyvinyl formal and polyvinyl butylal etc., acrylic resins and their copolymers, methacrylic resins and their copolymers, polystyrene resin, polyamide resin, linear polyester resins and polycarbonate resins etc. can be used as the thermoplastic resin. It is possible to prevent the resultant anti-reflection film from curling by adding a thermoplastic resin.

In addition, a surface conditioner, a refractive index adjusting agent, adhesion improving agent and a curing agent etc. may be added as an additive to the coating liquid for forming the antistatic hard coat layer.

The coating liquid for forming the antistatic hard coat layer which contains components described above is coated on the transparent substrate to form a coated layer. A coating method using a roll coater, a reverse roll coater, a gravure coater, a micro gravure coater, a knife coater, a bar coater, a wire bar coater, a die coater and a dip coater can be employed in order to coat the coating liquid for forming the antistatic hard coat layer on the transparent substrate.

Subsequently, the coated layer which is to be the antistatic hard coat layer on the transparent substrate is removed with the solvent contained in the coated layer by a drying process. Heating, sending air or hot air etc. can be employed as the drying method at this time.

The antistatic hard coat layer is formed by irradiating the coated layer obtained by coating the coating liquid for forming the antistatic hard coat layer on the transparent substrate with ionizing radiation. Ultraviolet radiation or electron beam can be used as the ionizing radiation. In the case of ultraviolet curing, a light source such as a high-pressure mercury lamp, a low-pressure mercury lamp, an ultrahigh-pressure mercury lamp, a metal halide lamp, a carbon arc, or a xenon arc can be used. Further, in the case of electron beam curing, an electron beam emitted from various electron beam accelerators such as a Cockroft-Walton accelerator, a Van de Graaff accelerator, a resonance transformer-type accelerator, an insulating core transformer-type accelerator, a linear accelerator, a dynamitron accelerator, or a high-frequency accelerator can be used. The electron beam preferably has energy of 50-1000 keV. An electron beam having energy of 100-300 keV is more preferred.

The antistatic hard coat layer is formed continuously in a roll-to-roll system. A transparent substrate in a web-form is continuously transferred from a wound-off reel to a wound-on reel by way of a coating unit, a drying unit and an ionizing radiation irradiating unit, whereby an antistatic hard coat layer is continuously formed.

Next, a method for forming the low refractive index layer on the antistatic hard coat layer is described. The low refractive index layer can be formed by a wet coating method in which a coating liquid for forming the low refractive index layer containing low refractive index particles, a binder matrix forming material and a solvent is coated on the antistatic hard coat layer to make a coated layer, which is subsequently cured.

Particles made of low refractive index materials such as LiF, MgF, 3NaF.AlF and AlF (refractive index of these: 1.4), and $Na_3AlF_6$ (cryolite, refractive index: 1.33) etc. can be used as the low refractive index particles. In addition, particles having pores therein are preferably used as the low refractive index particles. Particles having pores therein have a significantly small refractive index because the refractive index of pores is presumed to be as that of air (almost equal to 1). Specifically, silica particles having pores inside are available.

It is preferable that the low refractive index particles used in the low refractive index layer of the present invention have a size in the range of 1-100 nm in diameter. If the size exceeds 100 nm, the transparency of the anti-reflection film is liable to decrease because the low refractive index layer becomes white due to strong light reflection by Rayleigh scattering. On the other hand, if the size is less than 1 nm, the low refractive index particles agglutinate resulting in troubles such as uneven dispersion of the low refractive index particles in the low refractive index layer etc.

A silicon alkoxide hydrolysate can be used as the binder matrix forming material contained in the coating liquid for forming the low refractive index layer. Further, a hydrolysate of a silicon alkoxide which is expressed by a chemical formula (1): $R_xSi(OR')_{4-x}$, wherein R is an alkyl group and x is an integer satisfying $0 \leq x \leq 3$, can be used as the binder matrix forming material.

For example, tetramethoxysilane, tetraethoxysilane, tetra-iso-propoxysilane, tetra-n-propoxysilane, tetra-n-butoxysilane, tetra-sec-butoxysilane, tetra-tert-butoxysilane, tetrapentaethoxysilane, tetrapenta-iso-propoxysilane, tetrapenta-n-propoxysilane, tetrapenta-n-butoxysilane, tetrapenta-sec-butoxysilane, tetrapenta-tert-butoxysilane, methyltrimethoxysilane, methyltriethoxysilane, methyltripropoxysilane, methyltributoxysilane, dimethyldimethoxysilane, dimethyldiethoxysilane, dimethylethoxysilane, dimethylmethoxysilane, dimethylpropoxysilane, dimethylbutoxysilane, methyldimethoxysilane, methyldiethoxysilane and hexyltrimethoxysilane etc. can be used as the silicon alkoxide which is expressed by the chemical formula (1). The silicon alkoxide hydrolysate is obtained from the silicon alkoxides of the chemical formula (1) by, for example, a hydrolysis with hydrochloric acid.

Moreover, it is possible to add a silicon alkoxide hydrolysate of the chemical formula (2): $R'_zSi(OR)_{4-z}$, where R' is a inactive functional group having an alkyl group, a fluoroalkyl group or a fluoroalkylene oxide group and z is an integer satisfying $1 \leq z \leq 3$ to a silicon alkoxide hydrolysate of the chemical formula (1) as the binder matrix forming material for the coating liquid for forming a low refractive index layer. This addition of a silicon alkoxide hydrolysate of the chemical formula (2) provides antifouling properties to the low refractive index layer surface of the anti-reflection film and decreases the refractive index of the low refractive index layer further.

Examples of the silicon alkoxide of the chemical formula (2) are octadecyltrimethoxysilane and 1H, 1H, 2H, 2H-perfluorooctyltrimethoxysilane etc.

It is also possible to use an ionizing radiation curable material as the binder matrix forming material contained in the coating liquid for forming a low refractive index layer. An ionizing radiation curable material similar to the case of the coating liquid for forming the antistatic hard coat layer can be used as the ionizing radiation curable material herein. In addition, in the case where the low refractive index layer is formed using an ionizing radiation curable fluoro-compound, it is unnecessary to add low refractive index particles. In addition, even in the case of using an ionizing radiation curable material as the binder matrix forming material, it is preferable that a fluoro-material or a silicone type material, which provides antifouling properties, is also added.

In addition, solvents and additives can be added to the coating liquid for forming a low refractive index layer if necessary. Aromatic hydrocarbons such as toluene, xylene and cyclohexylbenzene etc., hydrocarbons such as cyclohexane and n-hexane etc., ethers such as dibutyl ether, dimethoxymethane, dimethoxyethane, diethoxyethane, propylene oxide, dioxane, dioxolane, trioxane, tetrahydrofuran, anisole and phenetol etc., ketones such as methyl isobutyl ketone, methyl butyl ketone, acetone, methyl ethyl ketone, diethyl ketone, dipropyl ketone, diisobutyl ketone, cyclopentanone, cyclohexanone and methylcyclohexanone etc., esters such as ethyl formate, propyl formate, n-pentyl formate, methyl acetate, ethyl acetate, methyl propionate, ethyl propionate, n-pentyl acetate and γ-butyrolactone etc., cellosolves such as methyl cellosolve, cellosolve, butyl cellosolve and cellosolve acetate etc., alcohols such as methanol, ethanol and isopropyl alcohol etc., and water can be used as the solvent considering coating suitability etc. In addition, additives such as antifoulant, surface conditioner, leveling agent, refractive index conditioner, adhesiveness improver and photosensitizer etc. can be added to the coating liquid.

In addition, in the case where the ionizing radiation curable material is used as the binder matrix forming material and the low refractive index layer is formed by irradiating ultraviolet light, a photopolymerization initiator is added to the coating liquid. The same photopolymerization initiators as those of the coating liquid for forming an antistatic hard coat layer including, for example, acetophenone, benzoin, benzophenone, phosphine oxides, ketals, anthraquinone and thioxanthone etc. can be used as the photopolymerization initiators of the low refractive index layer.

In the case where a silicon alkoxide hydrolysate is used as the binder matrix forming material in the coating liquid for forming the low refractive index layer, a coating liquid containing a silicon alkoxide hydrolysate and low refractive index particles is coated on the transparent substrate on which the antistatic hard coat layer has been preliminarily formed so as to form a coated layer followed by drying, heating to perform a dehydrocondensation of silicon alkoxide to form the low refractive index layer. Whereas in the case where an ionizing radiation curable material is used as the binder matrix forming material, a coating liquid containing an ionizing radiation curable material and low refractive index particles is coated on the transparent substrate on which the antistatic hard coat layer has been preliminarily formed so as to form a coated layer followed by drying if necessary and irradiating ionizing radiation such as ultraviolet light or an electron beam to form the low refractive index layer.

The similar methods to the coating method, drying method and irradiating method of ionizing radiation which are employed when forming the antistatic hard coat layer are also applicable for forming the low refractive index layer. The coating liquid for forming the low refractive index layer which contains components described above is coated onto the antistatic hard coat layer formed on the transparent substrate to form a coated layer. A coating method using a roll coater, a reverse roll coater, a gravure coater, a micro gravure coater, a knife coater, a bar coater, a wire bar coater, a die coater or a dip coater can be used as the coating method of the coating liquid for forming the low refractive index layer on the transparent substrate. The coated layer which is formed on the antistatic hard coat layer to be the low refractive index layer is subsequently removed with solvent by a drying process. Heating, sending air and hot air etc. can be used as the drying method at this time. Since there is no need to form the localized layer, any condition which makes it possible to remove solvent sufficiently can be used. The same condition as in the case of forming the antistatic hard coat layer can also be used.

In the case where the coating liquid for forming the low refractive index layer includes ionizing radiation curable material, the low refractive index layer is formed by irradiating the coated layer obtained by coating the coating liquid for forming the low refractive index layer on the antistatic hard coat layer with ionizing radiation. Ultraviolet radiation or electron beam can be used as the ionizing radiation. In the case of ultraviolet curing, a light source such as a high-pressure mercury lamp, a low-pressure mercury lamp, an ultrahigh-pressure mercury lamp, a metal halide lamp, a carbon arc, or a xenon arc can be used. Further, in the case of electron beam curing, an electron beam emitted from various electron beam accelerators such as a Cockroft-Walton accelerator, a Van de Graaff accelerator, a resonance transformer-type accelerator, an insulating core transformer-type accelerator, a linear accelerator, a dynamitron accelerator, or a high-frequency accelerator can be used. The electron beam preferably has energy of 50-1000 keV. An electron beam having energy of 100-300 keV is more preferred.

In addition, although an increase in costs is a disadvantage, it is also possible to form the low refractive index layer in the anti-reflection film of the present invention by depositing a low refractive index material such as silicon oxide etc. by means of a vacuum process such as a vacuum deposition method or a sputtering method.

The low refractive index layer of the anti-reflection film in the present invention has a refractive index in the range of 1.30-1.44 and is formed so as to have an optical thickness (nd), which is obtained by multiplying a thickness (d) by a refractive index (n), one fourth as long as the wavelength (λ) of the visible light. At this time, it is preferable that the optical thickness of the low refractive index layer is in the range of 115-135 nm. It is possible to make a reflection hue small by designing the optical thickness of the low refractive index layer within the range of 115-135 nm, which corresponds to around λ/4 when λ=500 nm. In addition, although there is a thickness variation in the low refractive index layer since this layer is formed by a wet coating method, it is possible to make an anti-reflection film have little color unevenness due to the thickness variation if the thickness of the low refractive index layer is adjusted within this range.

An anti-reflection film of the present invention can be manufactured as described above. If necessary, function layers having an antifouling function, an electromagnetic shielding function, an infrared absorption function, an ultraviolet absorption function and/or a color compensation function etc. are also arranged in the anti-reflection film of the present invention. Examples of these function layers are antifouling layer, electromagnetic shielding layer, infrared absorption layer, ultraviolet absorption layer and color compensation layer etc. It does not matter whether these function layers have a single layer structure or a multilayer structure. The function layer may have a plurality of functions within a single layer. In addition, it is possible to arrange the function layer on the surface of the anti-reflection film or between other layers. In addition, a primer layer or an adhesion layer etc. may be arranged between layers in order to improve adhesion between any adjacent layers.

The low refractive index layer is formed continuously in a roll-to-roll system. A web-form transparent substrate is continuously transferred from a wound-off reel to a wound-on reel by way of, if necessary, a coating unit, a drying unit (a heating unit) and an ionizing radiation irradiating unit, whereby a low refractive index layer is continuously formed.

A polarizing plate can be manufactured from the anti-reflection film of the present invention by arranging a polarizing layer and a second transparent substrate on the opposite side of the transparent substrate in the anti-reflection film of the present invention from the side on which the low refractive index layer is formed. It is possible to use, for example, elongated iodine-added polyvinyl alcohol (PVA) as the polarizing layer. In addition, the same material as the transparent substrate of the anti-reflection film in the present invention, preferably triacetyl cellulose, can also be used as the second transparent substrate.

In addition, the polarizing plate which uses the anti-reflection film of the present invention as a part thereof can be applied to a transmission type LCD. At this time, the polarizing plate is arranged in the order of the polarizing plate, a liquid crystal cell, a second polarizing plate, and a backlight unit from the observer's side. And, the low refractive index layer of the polarizing plate is arranged at the closest position to the observer. It is possible to provide a transmission type LCD with excellent optical properties such as antistatic function and anti-reflection function by applying the anti-reflection film or the polarizing plate of the present invention on the LCD surface.

EXAMPLES

Example 1

Transparent Substrate

An 80 μm thick triacetyl cellulose film was prepared as the transparent substrate.
<Formation of Antistatic Hard Coat Layer>
4.0 parts by weight of a dispersion liquid of antimony-doped tin oxide particles (ATO, average particle diameter: 8 nm, solid content ratio: 30 wt %, dispersion solvent: isopropyl alcohol) as the conductive particles, 7.8 parts by weight of dipentaerythritol hexaacrylate (DPHA), 7.8 parts by weight of pentaerythritol tetraacrylate (PETA) and 23.3 parts by weight of urethane acrylate UA-306T (made by Kyoeisha chemical Co., Ltd.) as the ionizing radiation curable material, 2.0 parts by weight of Irgacure 184 (by Ciba Japan) as the photopolymerization initiator, and 57.2 parts by weight of a solvent mixture of methyl ethyl ketone, dimethyl carbonate and diacetone alcohol having a blend ratio of 4:4:2 as the solvent were blended together to prepare a coating liquid for forming an antistatic hard coat layer with a solid content ratio of 40 wt % by weight.

The resultant coating liquid was coated on the transparent substrate by a wire bar coater to form a coated layer. Then the coated layer received room temperature drying at 25° C. for 30 seconds under a semi-encapsulated condition with 2-5 vol % of solvent atmosphere (primary drying process). It took 4 seconds for the solvent in the coated layer on the transparent substrate to evaporate off to a level below 10 wt % by room temperature drying. After room temperature drying, the coated layer was dried in an oven at 80° C. for one minute (secondary drying process). After drying, an ultraviolet irradiation with a 400 mJ/cm$^2$ of light exposure amount was performed on the coated layer using a conveyer type UV curing instrument so that a 5 μm thick antistatic hard coat layer was formed.
<Formation of Low Refractive Index Layer>
A 95:5 molar ratio mixture of tetraethoxysilane and 1H, 1H, 2H, 2H-perfluorooctyl trimethoxysilane as an organosilicon compound was added with isopropyl alcohol and 0.1 N hydrochloric acid and hydrolyzed to obtain a solution containing an organosilicon compound polymer. This solution was blended with a dispersion solution of low refractive index silica particles having pores therein (primary particle diameter: 30 nm, solid content: 20% by weight) and further added with isopropyl alcohol to obtain coating liquid for forming a low refractive index layer which contains 2.0 parts by weight of organosilicon compound and 2.0 parts by weight of low refractive index silica particles per 100 parts by weight. The coating liquid for forming a low refractive index layer was coated on the antistatic hard coat layer by a wire bar coater, and dried at 120° C. for one minute so that a low refractive index layer having an optical thickness (nd) one fourth as long as the wavelength of visible light was formed.

An anti-reflection film which had a transparent substrate, an antistatic hard coat layer and a low refractive index layer in order was manufactured as described above.

Example 2

Transparent Substrate

An 80 μm thick triacetyl cellulose film was prepared as the transparent substrates.
<Formation of Antistatic Hard Coat Layer>
1.7 parts by weight of a dispersion liquid of antimony-doped tin oxide particles (ATO, average particle diameter: 8 nm, solid content ratio: 30 wt %, dispersion solvent: isopropyl alcohol) as the conductive particles, 4.9 parts by weight of dipentaerythritol hexaacrylate (DPHA), 4.9 parts by weight of pentaerythritol tetraacrylate (PETA) and 14.7 parts by weight of urethane acrylate UA-306T (made by Kyoeisha chemical Co., Ltd.) as the ionizing radiation curable material, 1.5 parts by weight of Irgacure 184 (by Ciba Japan) as the photopolymerization initiator, and 73.8 parts by weight of a solvent mixture of methyl ethyl ketone, dimethyl carbonate and diacetone alcohol having a blend ratio of 4:4:2 as the solvent were blended together to prepare a coating liquid for forming an antistatic hard coat layer with a solid content ratio of 25 wt % by weight.

The resultant coating liquid was coated on the transparent substrate by a wire bar coater to form a coated layer. Then the coated layer received room temperature drying at 25° C. for 30 seconds under an open condition with 0.1 vol % or lower of solvent atmosphere (primary drying process). It took 6 seconds for the solvent in the coated layer on the transparent substrate to evaporate off to a level below 10 wt % by room temperature drying. After room temperature drying, the coated layer was dried in an oven at 80° C. for one minute (secondary drying process). After drying, an ultraviolet irradiation with a 400 mJ/cm$^2$ of light exposure amount was performed on the coated layer using a conveyer type UV curing instrument so that a 5 μm thick antistatic hard coat layer was formed.

<Formation of Low Refractive Index Layer>

A 95:5 molar ratio mixture of tetraethoxysilane and 1H, 1H, 2H, 2H-perfluorooctyl trimethoxysilane as an organosilicon compound was added with isopropyl alcohol and 0.1 N hydrochloric acid and hydrolyzed to obtain a solution containing an organosilicon compound polymer. This solution was blended with a dispersion solution of low refractive index silica particles having pores therein (primary particle diameter: 30 nm, solid content: 20% by weight) and further added with isopropyl alcohol to obtain a coating liquid for forming a low refractive index layer which contains 2.0 parts by weight of organosilicon compound and 2.0 parts by weight of low refractive index silica particles per 100 parts by weight. The coating liquid for forming a low refractive index layer was coated on the antistatic hard coat layer by a wire bar coater, and dried at 120° C. for one minute so that a low refractive index layer having an optical thickness (nd) one fourth as long as the wavelength of visible light was formed.

An anti-reflection film which had a transparent substrate, an antistatic hard coat layer and a low refractive index layer in order was manufactured as described above.

Example 3

Transparent Substrate

An 80 μm thick triacetyl cellulose film was prepared as the transparent substrate.

<Formation of Antistatic Hard Coat Layer>

4.0 parts by weight of a dispersion liquid of antimony-doped tin oxide particles (ATO, average particle diameter: 20 nm, solid content ratio: 30 wt %, dispersion solvent: isopropyl alcohol) as the conductive particles, 7.8 parts by weight of dipentaerythritol hexaacrylate (DPHA), 7.8 parts by weight of pentaerythritol tetraacrylate (PETA) and 23.3 parts by weight of urethane acrylate UA-306T (made by Kyoeisha chemical Co., Ltd.) as the ionizing radiation curable material, 2.0 parts by weight of Irgacure 184 (by Ciba Japan) as the photopolymerization initiator, and 57.2 parts by weight of a solvent mixture of methyl ethyl ketone, dimethyl carbonate and diacetone alcohol having a blend ratio of 4:4:2 as the solvent were blended together to prepare a coating liquid for forming an antistatic hard coat layer with a solid content ratio of 40 wt % by weight.

The resultant coating liquid was coated on the transparent substrate by a wire bar coater to form a coated layer. Then the coated layer received room temperature drying at 25° C. for 30 seconds under a semi-encapsulated condition with 2-5 vol % of solvent atmosphere (primary drying process). It took 4 seconds for the solvent in the coated layer on the transparent substrate to evaporate off to a level below 10 wt % by room temperature drying. After room temperature drying, the coated layer was dried in an oven at 80° C. for one minute (secondary drying process). After drying, an ultraviolet irradiation with a 400 mJ/cm$^2$ of light exposure amount was performed on the coated layer using a conveyer type UV curing instrument so that a 5 μm thick antistatic hard coat layer was formed.

<Formation of Low Refractive Index Layer>

8.0 parts by weight of a dispersion liquid of low refractive index silica particles (average particle diameter: 30 nm, solid content ratio: 20 wt %), 2.4 parts by weight of dipentaerythritol hexaacrylate (DPHA) as an ionizing radiation curable material, 0.2 parts by weight of TSF44 (by Toshiba GE silicone Ltd.) as a silicone additive, 0.2 parts by weight of Irgacure 184 (by Ciba Japan) as a photopolymerization initiator and 89.6 parts by weight of methyl isobutyl ketone as a solvent were blended together to prepare the coating liquid for forming the low refractive index layer. The coating liquid for forming the low refractive index layer was coated on the antistatic hard coat layer by a wire bar coater, and dried in an oven. After drying, an ultraviolet irradiation with a 500 mJ/cm$^2$ of light exposure amount was performed on the coated layer using a conveyer type UV curing instrument so that a low refractive index layer having an optical thickness (nd) one fourth as long as the wavelength of visible light was formed.

An anti-reflection film which had a transparent substrate, an antistatic hard coat layer and a low refractive index layer in order was manufactured as described above.

Example 4

Transparent Substrate

An 80 μm thick triacetyl cellulose film was prepared as the transparent substrate.

<Formation of Antistatic Hard Coat Layer>

4.0 parts by weight of a dispersion liquid of antimony-doped tin oxide particles (ATO, average particle diameter: 8 nm, solid content ratio: 30 wt %, dispersion solvent: isopropyl alcohol) as the conductive particles, 7.8 parts by weight of dipentaerythritol hexaacrylate (DPHA), 7.8 parts by weight of pentaerythritol tetraacrylate (PETA) and 23.3 parts by weight of urethane acrylate UA-306T (made by Kyoeisha chemical Co., Ltd.) as the ionizing radiation curable material, 2.0 parts by weight of Irgacure 184 (by Ciba Japan) as the photopolymerization initiator, and 57.2 parts by weight of a solvent mixture of methyl ethyl ketone, dimethyl carbonate and diacetone alcohol having a blend ratio of 5:2:3 as the solvent were blended together to prepare a coating liquid for forming an antistatic hard coat layer with a solid content ratio of 40 wt % by weight.

The resultant coating liquid was coated on the transparent substrate by a wire bar coater to form a coated layer. Then the coated layer received room temperature drying at 25° C. for 30 seconds under an open condition with 0.1 vol % or lower of solvent atmosphere (primary drying process). It took 25 seconds for the solvent in the coated layer on the transparent substrate to evaporate off to a level below 10 wt % by room temperature drying. After room temperature drying, the coated layer was dried in an oven at 80° C. for one minute (secondary drying process). After drying, an ultraviolet irradiation with a 400 mJ/cm$^2$ of light exposure amount was performed on the coated layer using a conveyer type UV curing instrument so that a 5 μm thick antistatic hard coat layer was formed.

<Formation of Low Refractive Index Layer>

8.0 parts by weight of a dispersion liquid of low refractive index silica particles (average particle diameter: 30 nm, solid content ratio: 20 wt %), 2.4 parts by weight of dipentaerythritol hexaacrylate (DPHA) as an ionizing radiation curable material, 0.2 parts by weight of TSF44 (by Toshiba GE silicone Ltd.) as a silicone additive, 0.2 parts by weight of Irgacure 184 (by Ciba Japan) as a photopolymerization initiator and 89.6 parts by weight of methyl isobutyl ketone as a solvent were blended together to prepare the coating liquid for forming the low refractive index layer. The coating liquid for forming the low refractive index layer was coated on the antistatic hard coat layer by a wire bar coater, and dried in an oven. After drying, an ultraviolet irradiation with a 500 mJ/cm$^2$ of light exposure amount was performed on the coated layer using a conveyer type UV curing instrument so that a low refractive index layer having an optical thickness (nd) one fourth as long as the wavelength of visible light was formed.

An anti-reflection film which had a transparent substrate, an antistatic hard coat layer and a low refractive index layer in order was manufactured as described above.

Comparative Example 1

Transparent Substrate

An 80 μm thick triacetyl cellulose film was prepared as the transparent substrate.
<Formation of Hard Coat Layer>
10 parts by weight of dipentaerythritol hexaacrylate, 10 parts by weight of pentaerythritol tetraacrylate and 30 parts by weight of urethane acrylate (UA-306T by Kyoeisha chemical Co., Ltd.) as the ionizing radiation curable material, 2.5 parts by weight of Irgacure 184 (by Ciba Japan) as the photopolymerization initiator, and 25 parts by weight of methyl ethyl ketone and 25 parts by weight of butyl acetate as the solvent were blended together to prepare a coating liquid for forming a hard coat layer. The coating liquid for forming a hard coat layer was coated on the triacetyl cellulose film by a wire bar coater. Subsequently, the triacetyl cellulose film coated by the coating liquid for forming a hard coat layer was dried in an oven at 80° C. for one minute. After drying, an ultraviolet irradiation with a 400 mJ/cm$^2$ of light exposure amount was performed on the coated layer using a conveyer type UV curing instrument so that a 5 μm thick hard coat layer was formed.
<Formation of Antistatic Layer>
Tetraethoxysilane as an organosilicon compound raw material was added with isopropyl alcohol and 0.1 N hydrochloric acid and hydrolyzed to obtain a solution containing tetraethoxysilane polymer. This solution was admixed with a dispersion solution of antimony doped tin oxide (ATO) particles, and further added with isopropyl alcohol to obtain a coating liquid for forming an antistatic layer which contains 2.5 parts by weight of tetraethoxysilane polymer and 2.5 parts by weight of ATO particles. The resultant coating liquid for forming an antistatic layer was coated onto the hard coat layer by a wire bar coater after the hard coat layer received an alkaline treatment, and then dried in an oven at 120° C. for one minute so that an antistatic layer was obtained. The antistatic layer was formed to have an optical thickness ¼ as long as the wavelength of the visible light.
<Formation of Low Refractive Index Layer>
A 95:5 molar ratio mixture of tetraethoxysilane and 1H, 1H, 2H, 2H-perfluorooctyl trimethoxysilane as an organosilicon compound was added with isopropyl alcohol and 0.1 N hydrochloric acid and hydrolyzed to obtain a solution containing an organosilicon compound polymer. This solution was blended with a dispersion solution of low refractive index silica particles having pores therein (primary particle diameter: 30 nm, solid content: 20% by weight) and further added with isopropyl alcohol to obtain coating liquid for forming a low refractive index layer which contains 2.0 parts by weight of organosilicon compound and 2.0 parts by weight of low refractive index silica particles per 100 parts by weight. The coating liquid for forming a low refractive index layer was coated onto the antistatic layer by a wire bar coater, and dried at 120° C. for one minute so that a low refractive index layer having an optical thickness ¼ as long as the wavelength of the visible light was obtained.

An anti-reflection film which included a transparent substrate, a hard coat layer, an antistatic layer and a low refractive index layer in order was manufactured as described above.

Comparative Example 2

Transparent Substrate

An 80 μm thick triacetyl cellulose film was prepared as the transparent substrate.
<Formation of Antistatic Hard Coat Layer>
33.3 parts by weight of a dispersion liquid of antimony-doped tin oxide particles (ATO, average particle diameter: 8 nm, solid content ratio: 30 wt %, dispersion solvent: isopropyl alcohol) as the conductive particles, 8.3 parts by weight of dipentaerythritol hexaacrylate (DPHA), 8.3 parts by weight of pentaerythritol tetraacrylate (PETA) and 25 parts by weight of urethane acrylate UA-306T (made by Kyoeisha chemical Co., Ltd.) as the ionizing radiation curable material, 2.1 parts by weight of Irgacure 184 (by Ciba Japan) as the photopolymerization initiator, and 23 parts by weight of toluene as the solvent were blended together to prepare a coating liquid for forming an antistatic hard coat layer with a solid content ratio of 75 wt % by weight.

The resultant coating liquid was coated on the transparent substrate by a wire bar coater to form a coated layer. Then the triacetyl cellulose film with the coated layer thereon was dried in an oven at 80° C. for one minute. After drying, an ultraviolet irradiation with a 400 mJ/cm$^2$ of light exposure amount was performed on the coated layer using a conveyer type UV curing instrument so that a 5 μm thick antistatic hard coat layer was formed on the transparent substrate.
<Formation of Low Refractive Index Layer>
A 95:5 molar ratio mixture of tetraethoxysilane and 1H, 1H, 2H, 2H-perfluorooctyl trimethoxysilane as an organosilicon compound was added with isopropyl alcohol and 0.1 N hydrochloric acid and hydrolyzed to obtain a solution containing an organosilicon compound polymer. This solution was blended with a dispersion solution of low refractive index silica particles having pores therein (primary particle diameter: 30 nm, solid content: 20% by weight) and further added with isopropyl alcohol to obtain coating liquid for forming a low refractive index layer which contains 2.0 parts by weight of organosilicon compound and 2.0 parts by weight of low refractive index silica particles per 100 parts by weight. The coating liquid for forming a low refractive index layer was coated onto the antistatic hard coat layer by a wire bar coater, and dried in an oven at 120° C. for one minute so that a low refractive index layer having an optical thickness ¼ as long as the wavelength of the visible light was obtained.

An anti-reflection film which included a transparent substrate, an antistatic hard coat layer and a low refractive index layer in order was manufactured as described above.

Comparative Example 3

Transparent Substrate

An 80 μm thick triacetyl cellulose film was prepared as the transparent substrate.
<Formation of Antistatic Hard Coat Layer>
4.0 parts by weight of a dispersion liquid of antimony-doped tin oxide particles (ATO, average particle diameter: 8 nm, solid content ratio: 30 wt %, dispersion solvent: isopropyl alcohol) as the conductive particles, 7.8 parts by weight of dipentaerythritol hexaacrylate (DPHA), 7.8 parts by weight of pentaerythritol tetraacrylate (PETA) and 23.3 parts by weight of urethane acrylate UA-306T (made by Kyoeisha chemical Co., Ltd.) as the ionizing radiation curable material, 2.0 parts by weight of Irgacure 184 (by Ciba Japan) as the photopolymerization initiator, and 57.2 parts by weight of toluene as the solvent were blended together to prepare a coating liquid for forming an antistatic hard coat layer with a solid content ratio of 40 wt % by weight.

The resultant coating liquid was coated on the transparent substrate by a wire bar coater to form a coated layer. Then the coated layer received room temperature drying at 25° C. for 30 seconds under an open condition with 0.1 vol % or lower of solvent atmosphere (primary drying process). It took 4 seconds for the solvent in the coated layer on the transparent substrate to evaporate off to a level below 10 wt % by room temperature drying. After room temperature drying, the coated layer was dried in an oven at 80° C. for one minute (secondary drying process). After drying, an ultraviolet irradiation with a 400 mJ/cm$^2$ of light exposure amount was performed on the coated layer using a conveyer type UV curing instrument so that a 5 µm thick antistatic hard coat layer was formed.

<Formation of Low Refractive Index Layer>

A 95:5 molar ratio mixture of tetraethoxysilane and 1H, 1H, 2H, 2H-perfluorooctyl trimethoxysilane as an organosilicon compound was added with isopropyl alcohol and 0.1 N hydrochloric acid and hydrolyzed to obtain a solution containing an organosilicon compound polymer. This solution was blended with a dispersion solution of low refractive index silica particles having pores therein (primary particle diameter: 30 nm, solid content: 20% by weight) and further added with isopropyl alcohol to obtain coating liquid for forming a low refractive index layer which contains 2.0 parts by weight of organosilicon compound and 2.0 parts by weight of low refractive index silica particles per 100 parts by weight. The coating liquid for forming a low refractive index layer was coated onto the antistatic hard coat layer by a wire bar coater, and dried in an oven at 120° C. for one minute so that a low refractive index layer having an optical thickness ¼ as long as the wavelength of the visible light was obtained.

An anti-reflection film which included a transparent substrate, an antistatic hard coat layer and a low refractive index layer in order was manufactured as described above.

Comparative Example 4

Transparent Substrate

An 80 µm thick triacetyl cellulose film was prepared as the transparent substrate.

<Formation of Antistatic Hard Coat Layer>

5.0 parts by weight of a dispersion liquid of antimony-doped tin oxide particles (ATO, average particle diameter: 8 nm, solid content ratio: 30 wt %, dispersion solvent: isopropyl alcohol) as the conductive particles, 4.7 parts by weight of dipentaerythritol hexaacrylate (DPHA), 4.7 parts by weight of pentaerythritol tetraacrylate (PETA) and 14.1 parts by weight of urethane acrylate UA-306T (made by Kyoeisha chemical Co., Ltd.) as the ionizing radiation curable material, 1.5 parts by weight of Irgacure 184 (by Ciba Japan) as the photopolymerization initiator, and 71.5 parts by weight of a solvent mixture of methyl ethyl ketone and isopropyl alcohol having a blend ratio of 1:3 as the solvent were blended together to prepare a coating liquid for forming an antistatic hard coat layer with a solid content ratio of 25 wt % by weight.

The resultant coating liquid was coated on the transparent substrate by a wire bar coater to form a coated layer. Then the coated layer received a room temperature drying at 25° C. for 30 seconds under an open condition with 0.1 vol % or lower of solvent atmosphere (primary drying process). It took 2 seconds for the solvent in the coated layer on the transparent substrate to evaporate off to a level below 10 wt % by room temperature drying. After room temperature drying, the coated layer was dried in an oven at 80° C. for one minute (secondary drying process). After the drying, an ultraviolet irradiation with a 400 mJ/cm$^2$ of light exposure amount was performed on the coated layer using a conveyer type UV curing instrument so that a 5 µm thick antistatic hard coat layer was formed.

<Formation of Low Refractive Index Layer>

A 95:5 molar ratio mixture of tetraethoxysilane and 1H, 1H, 2H, 2H-perfluorooctyl trimethoxysilane as an organosilicon compound was added with isopropyl alcohol and 0.1 N hydrochloric acid and hydrolyzed to obtain a solution containing an organosilicon compound polymer. This solution was blended with a dispersion solution of low refractive index silica particles having pores therein (primary particle diameter: 30 nm, solid content: 20% by weight) and further added with isopropyl alcohol to obtain coating liquid for forming a low refractive index layer which contains 2.0 parts by weight of organosilicon compound and 2.0 parts by weight of low refractive index silica particles per 100 parts by weight. The coating liquid for forming a low refractive index layer was coated onto the antistatic hard coat layer by a wire bar coater, and dried in an oven at 120° C. for one minute so that a low refractive index layer having an optical thickness ¼ as long as the wavelength of the visible light was obtained.

An anti-reflection film which included a transparent substrate, an antistatic hard coat layer and a low refractive index layer in order was manufactured as described above.

Measurements and evaluations described below were made with respect to the resultant anti-reflection film in the present invention.

<<Spectral Reflectance>>

The anti-reflection films obtained in the examples and comparative examples were painted black with matte-black spray on the opposite side from the surface on which the low refractive index layer was formed. After painting, spectral reflectance on the low refractive index layer surface at 5 degrees of incident angle was measured using automated spectral photometer (U-4000 made by Hitachi Ltd.) under a condition of C light source and 2 degrees of field of view. Then, the existence of the localized layer in the antistatic hard coat layer, the optical thickness of the localized layer, the refractive index of the localized layer, the refractive index of the intermediate layer, and the refractive index and the optical thickness of the low refractive index layer were obtained from the resultant spectral reflectance curve by an optical simulation method. In addition, the existence of the mixed layer was confirmed from the spectral reflectance curve. The refractive index and optical thickness of the antistatic layer was obtained with regard to the film of the comparative example 1.

Table 1 shows the result concerning the existence of the localized layer in the antistatic hard coat layer, the optical thickness of the localized layer, the refractive index of the localized layer, the refractive index of the intermediate layer, and the refractive index and the optical thickness of the low refractive index layer. As for the comparative example 1, the refractive index of the hard coat layer and the antistatic layer are filled instead of the refractive index of the intermediate layer and the localized layer, respectively, in the table. In addition, as for the comparative examples 2 and 3, the refractive index of the antistatic hard coat layer is filled as the refractive index of the intermediate layer.

<<Average Luminous Reflectance and Reflection Hue>>

The anti-reflection films obtained in the examples and comparative examples were painted black with matte-black spray on the opposite side from the surface on which the low refractive index layer was formed. After painting, spectral reflectance on the low refractive index layer surface at 5 degrees of incident angle was measured using automated spectral photometer (U-4000 made by Hitachi Ltd.) under a condition of C light source and 2 degrees of field of view. Then, average luminous reflectance (Y %) and reflection hue (a*, b*) are calculated from the result of the spectral reflectance. Photopic relative luminous efficiency is used as the relative luminous efficiency.

<<Haze (H) and Parallel Light Transmittance>>

The anti-reflection films obtained in the examples and comparative examples were measured for haze (H) and parallel light transmittance by a haze turbidimeter instrument (NDH-2000 made by Nippon Denshoku Industries Co., Ltd.).

<<Surface Resistivity>>

The surface resistivities of the anti-reflection films were measured conforming to JIS (Japanese Industrial Standards) K6911 by a high resistivity measurement meter (Hiresta MCP-HT260 made by DIA Instruments Co., Ltd.).

<<Color Unevenness and Interference Fringe>>

Light of a fluorescent lamp falling in and reflected on the surface of the low refractive index layers of the anti-reflection films obtained in the examples and the comparative examples was observed and checked if color unevenness and/or interference fringe appeared.

<<Binder Matrix Component Ratio in the Mixed Layer and the Intermediate Layer>>

Cross section samples of the anti-reflection films obtained in the example 1 to example 4 were made by a microtome. The cross sections of the resultant samples were observed and it was confirmed that the boundaries between the transparent substrates and the anti-reflection films were vague and unclear (due to the formation of the mixed layer). The mixed layers had a thickness of 0.5 μm or more in the cross sectional profile. In addition, the triacetyl cellulose content amounts in the intermediate layers of the cross section samples were counted by a Raman spectrum analyzer while the conductive particles content amounts in the intermediate layers were counted by an energy dispersive fluorescence analyzer. Then,

TABLE 1

| | Antistatic hard coat layer (or Hard coat layer) | | | | Low refractive index layer | |
|---|---|---|---|---|---|---|
| | Existence of LL and IL | Intermediate layer (=IL) Refractive index | Localized layer (=LL) Refractive index | Localized layer (=LL) Optical thickness (nm) | Refractive index | Optical thickness (nm) |
| Example 1 | Exist | 1.52 | 1.55 | 280 | 1.37 | 130 |
| Example 2 | Exist | 1.52 | 1.53 | 230 | 1.37 | 125 |
| Example 3 | Exist | 1.52 | 1.54 | 265 | 1.39 | 130 |
| Example 4 | Exist | 1.52 | 1.55 | 230 | 1.39 | 130 |
| Comparative example 1 | No LL | 1.52‡1 | 1.60‡2 | 125‡2 | 1.37 | 130 |
| Comparative example 2 | Not exist | 1.58‡3 | Not formed | Not formed | 1.37 | 130 |
| Comparative example 3 | Not exist | 1.54‡3 | Not formed | Not formed | 1.37 | 130 |
| Comparative example 4 | Exist, but insufficient | 1.52 | 1.55 | 1100 | 1.37 | 130 |

‡1 A value of hard coat layer.
‡2 A value of antistatic layer.
‡3 A value of antistatic hard coat layer.

Table 2 summarizes each of the content ratios (% by weight) of the conductive particles in the antistatic hard coat layer, amount (g/m²) of the conductive particles contained in a unit area of the antistatic hard coat layer, the solvent ratio (% by weight) in the coating liquid for forming the antistatic hard coat layer, and the amount ratio (% by weight) of the solvent which dissolves the transparent substrate or causes the transparent substrate to swell relative to the entire solvent in the coating liquid as the content ratio of the conductive particles (wt %), content amount of the conductive particles (g/m²), solvent ratio in the coating liquid (wt %), and ratio of the solvent for dissolving/swelling to the entire solvent (wt %), respectively.

TABLE 2

| | Antistatic hard coat layer | | | Coating liquid for forming antistatic hard coat layer |
|---|---|---|---|---|
| | Content ratio of conductive particles (wt %) | Amount of conductive particles per unit area (g/m²) | Content ratio of solvent (wt %) | Ratio of the solvent for dissolving/swelling to the entire solvent (wt %) |
| Example 1 | 3.0 | 0.18 | 60 | 76.3 |
| Example 2 | 2.0 | 0.12 | 75 | 78.7 |
| Example 3 | 3.0 | 0.18 | 60 | 76.3 |
| Example 4 | 3.0 | 0.18 | 60 | 66.7 |
| Comparative example 1 | 50‡1 | 0.10‡1 | 50‡2 | 100‡2 |
| Comparative example 2 | 19.4 | 1.40 | 47.3 | 0 |
| Comparative example 3 | 3.0 | 0.18 | 60 | 0 |
| Comparative example 4 | 6.0 | 0.36 | 75 | 23.8 |

‡1 A value of antistatic layer.
‡2 A value of hard coat layer.

the ratios of the binder matrix components (wt %) were obtained by subtracting the triacetyl cellulose content amounts (wt %) and the conductive particles content amounts (wt %) from the entire intermediate layer (100 wt %).

Table 3A and 3B show the measurement results of the average luminous reflectance, the parallel light transmittance, the haze, the reflection hue, the surface resistivity and the binder matrix component ratio in the intermediate layer as well as the evaluation results of the color unevenness and the interference fringe. In the comparative example 2 and 3, the color unevenness was not evaluated because the interference fringes were severely strong.

TABLE 3A

| | Average luminous reflectance | Parallel light transmittance | Haze | Reflection hue | |
|---|---|---|---|---|---|
| | (%) | (%) | (%) | a * | b * |
| Example 1 | 1.1 | 95.2 | 0.2 | 1.80 | 0.38 |
| Example 2 | 1.1 | 95.3 | 0.2 | 1.92 | −0.71 |
| Example 3 | 1.5 | 95.6 | 0.2 | 1.08 | 0.27 |
| Example 4 | 1.5 | 95.4 | 0.2 | 1.56 | −1.10 |
| Comparative example 1 | 0.5 | 96.0 | 0.1 | 10.50 | −4.45 |
| Comparative example 2 | 1.1 | 85.2 | 0.6 | 2.60 | −0.81 |
| Comparative example 3 | 1.1 | — | — | 3.12 | −1.65 |
| Comparative example 4 | 1.1 | — | — | 2.37 | 0.48 |

TABLE 3B

| | Surface resistivity (Ω/□) | Color unevenness evaluation | Interference fringe evaluation | Binder matrix component ratio in intermediate layer (%) |
|---|---|---|---|---|
| Example 1 | $9.0 \times 10^9$ | Not appear | Not appear | 98.4 |
| Example 2 | $2.8 \times 10^{10}$ | Not appear | Not appear | 96.7 |
| Example 3 | $5.0 \times 10^{10}$ | Not appear | Not appear | 97.1 |
| Example 4 | $7.0 \times 10^9$ | Not appear | Not appear | 96.1 |
| Comparative example 1 | $1.2 \times 10^{10}$ | Appear | Not appear | — |
| Comparative example 2 | $2.0 \times 10^{10}$ | — | Appear | — |
| Comparative example 3 | $>1.0 \times 10^{13}$ | — | Appear | — |
| Comparative example 4 | $1.6 \times 10^{11}$ | — | Appear | — |

">$1.0 \times 10^{13}$" means "larger than $1.0 \times 10^{13}$".

The comparative example 1 is an example in which the hard coat layer and the antistatic layer were separately formed. In this example, color unevenness caused by the thickness unevenness of the antistatic layer and the low refractive index layer appeared.

The comparative example 2 and 3 are examples in which the coating liquid for forming the antistatic hard coat layer contained no solvents which dissolved the transparent substrate or caused the transparent substrate to swell. In addition, the comparative example 2 is an example in which the content amount of the conductive particles is large. In the comparative example 2, although the surface resistivity was sufficiently high, the parallel light transmittance heavily decreased and the haze was large because of a large amount of added conductive particles. In the comparative example 3, it was impossible to obtain sufficient antistatic performance due to a lack of the conductive particles in the antistatic hard coat layer. In addition, in these examples, the interference fringe appeared due to the difference in refractive index between the substrate and the film.

In the comparative example 4, the interference fringe was generated since the localized layer was formed insufficiently and the thickness was inappropriate although at least the mixed layer and the localized layer were formed.

On the other hand, the anti-reflection films of the examples provided sufficient antistatic functions without decreasing parallel light transmittance or increasing haze because a small amount of conductive particles were added. In addition, the anti-reflection films of the examples were manufactured with lower costs than that in the case of the antistatic layer and the hard coat layer were separately formed (comparative example 1). Moreover, in the anti-reflection films of the examples, it was possible to improve optical properties by using the localized layer as a high refractive index layer as well. Specifically, anti-reflection films having no color unevenness and a small reflection hue were obtained.

What is claimed is:
1. An anti-reflection film comprising:
a transparent substrate;
an antistatic hard coat layer; and
a low refractive index layer, said antistatic hard coat layer and said low refractive index layer being formed on said transparent substrate, said antistatic hard coat layer containing conductive particles and a binder matrix, said antistatic hard coat layer including a mixed layer in which said binder matrix and a component of said transparent substrate blend together with a gradient and a localized layer which comprises said conductive particles and said binder matrix, said mixed layer being optically indistinguishable, and said localized layer being optically distinguishable and having an optical thickness of 50-400 nm.

2. The anti-reflection film according to claim 1, wherein said optical thickness of said localized layer is 200-350 nm.

3. The anti-reflection film according to claim 1, wherein a content ratio of said conductive particles in said antistatic hard coat layer is 0.5-5 wt % and a content amount of said conductive particles per unit area of said antistatic hard coat layer is 0.05-0.5 g/m².

4. The anti-reflection film according to claim 1, further comprising:
an intermediate layer which is optically indistinguishable and is arranged between said mixed layer and said localized layer.

5. The anti-reflection film according to claim 4, wherein said localized layer has a larger refractive index than said intermediate layer by a difference of 0.01-0.05.

6. The anti-reflection film according to claim 4, wherein said intermediate layer includes 95 wt % or more of said binder matrix.

7. The anti-reflection film according to claim 4, wherein said intermediate layer has a thickness of 2 μm or more.

8. The anti-reflection film according to claim 1, wherein said antistatic hard coat layer has a thickness of 3-15 μm.

9. The anti-reflection film according to claim 1, wherein said mixed layer has a thickness of 0.5 μm or more.

10. The anti-reflection film according to claim 1, wherein a parallel light transmittance thereof is 93.0-97.0%, and a surface resistivity of said low refractive index layer is $1.0 \times 10^6$ to $1.0 \times 10^{11}$ Ω/□.

11. The anti-reflection film according to claim 1, wherein an average luminous reflectance on said low refractive index layer surface is 0.5-1.5%, and a reflection hue in an L*a*b* chromaticity coordinate system on said low refractive index layer surface satisfies $0.00 \leq a^* \leq 3.00$ and $-3.00 \leq b^* \leq 3.00$.

12. The anti-reflection film according to claim 1, wherein said transparent substrate is mainly made of triacetyl cellulose film.

* * * * *